United States Patent
Bittan et al.

(10) Patent No.: US 10,311,588 B2
(45) Date of Patent: Jun. 4, 2019

(54) TIMING PULSES IN A DEPTH SENSING DEVICE

(71) Applicant: MANTISVISION LTD., Petach Tikva (IL)

(72) Inventors: Gur Arie Bittan, Shoham (IL); Yonatan Samet, Ramat Gan (IL)

(*) Notice: Subject to any disclaimer, the term of this patent is extended or adjusted under 35 U.S.C. 154(b) by 0 days.

(21) Appl. No.: 15/112,200

(22) PCT Filed: Jan. 19, 2015

(86) PCT No.: PCT/IL2015/050062
§ 371 (c)(1),
(2) Date: Jul. 18, 2016

(87) PCT Pub. No.: WO2015/107529
PCT Pub. Date: Jul. 23, 2015

(65) Prior Publication Data
US 2017/0323455 A1    Nov. 9, 2017

(30) Foreign Application Priority Data

Jan. 19, 2014  (IL) .......................... 230517

(51) Int. Cl.
*G06T 7/50* (2017.01)
*G01B 11/25* (2006.01)
(Continued)

(52) U.S. Cl.
CPC ............ *G06T 7/50* (2017.01); *G01B 11/2513* (2013.01); *G01C 3/08* (2013.01); *G01S 17/36* (2013.01);
(Continued)

(58) Field of Classification Search
CPC ......... G06T 7/50; G01B 11/2513; G01C 3/08; G01S 17/36; G06K 9/209; H04N 5/3765; H04N 5/0733; H04N 5/073
See application file for complete search history.

(56) References Cited

U.S. PATENT DOCUMENTS

| | | |
|---|---|---|
| 8,090,194 B2 | 1/2012 | Gordon et al. |
| 8,538,166 B2 | 9/2013 | Gordon et al. |

(Continued)

FOREIGN PATENT DOCUMENTS

| | | |
|---|---|---|
| CN | 101013159 | 8/2007 |
| CN | 106104300 A | 11/2016 |
| WO | WO 2015/107529 | 7/2015 |

OTHER PUBLICATIONS

PCT International Search Report issued in PCT/IL2015/050062 dated Jul. 23, 2016.

(Continued)

*Primary Examiner* — Nicholas G Giles
(74) *Attorney, Agent, or Firm* — Finnegan, Henderson, Farabow, Garrett & Dunner, LLP

(57) ABSTRACT

There is provided in accordance with an aspect of the presently disclosed subject matter, a method operating a depth sensing device. The method includes obtaining a current pulse timing on each of a first and a second depth sensing devices; and allocating an exclusive pulse timeslot to each of said first and second devices, so that during a portion of a frame which corresponds to any one of the pulse timeslots only a respective one of said first device and said second device emits a pulse.

18 Claims, 15 Drawing Sheets

(51) Int. Cl.
  *G01C 3/08* (2006.01)
  *G01S 17/36* (2006.01)
  *G01S 17/87* (2006.01)
  *G01S 17/89* (2006.01)
  *G06K 9/20* (2006.01)

(52) U.S. Cl.
  CPC .............. *G01S 17/87* (2013.01); *G01S 17/89* (2013.01); *G06K 9/209* (2013.01)

(56) References Cited

U.S. PATENT DOCUMENTS

| | | | |
|---|---|---|---|
| 2003/0198271 A1 | 10/2003 | Matveev | |
| 2007/0182949 A1* | 8/2007 | Niclass | G01C 3/08 356/3 |
| 2008/0024352 A1* | 1/2008 | Shirakawa | G01S 13/003 342/28 |
| 2010/0188504 A1* | 7/2010 | Dimsdale | G01C 11/06 348/142 |
| 2012/0086095 A1* | 4/2012 | Nishiyama | H01L 27/14609 257/432 |
| 2013/0120636 A1 | 5/2013 | Baer | |
| 2015/0304638 A1* | 10/2015 | Cho | H04N 13/0207 348/46 |
| 2016/0191867 A1 | 6/2016 | Abraham | |
| 2017/0120842 A1* | 5/2017 | Tanaka | G02B 27/286 |
| 2017/0127036 A1* | 5/2017 | You | H04N 5/2256 |

OTHER PUBLICATIONS

First Office Action issued in Chinese Application No. 201580013759 dated Nov. 30, 2017.
First Search Report issued in Chinese Application No. 201580013759 dated Nov. 22, 2017.
PCT Written Opinion of International Searching Authority issued in PCT/IL2015/050062 dated May 18, 2015.
PCT International Preliminary Report on Patentability issued in PCT/IL2015/050062 dated Jul. 19, 2016.

* cited by examiner

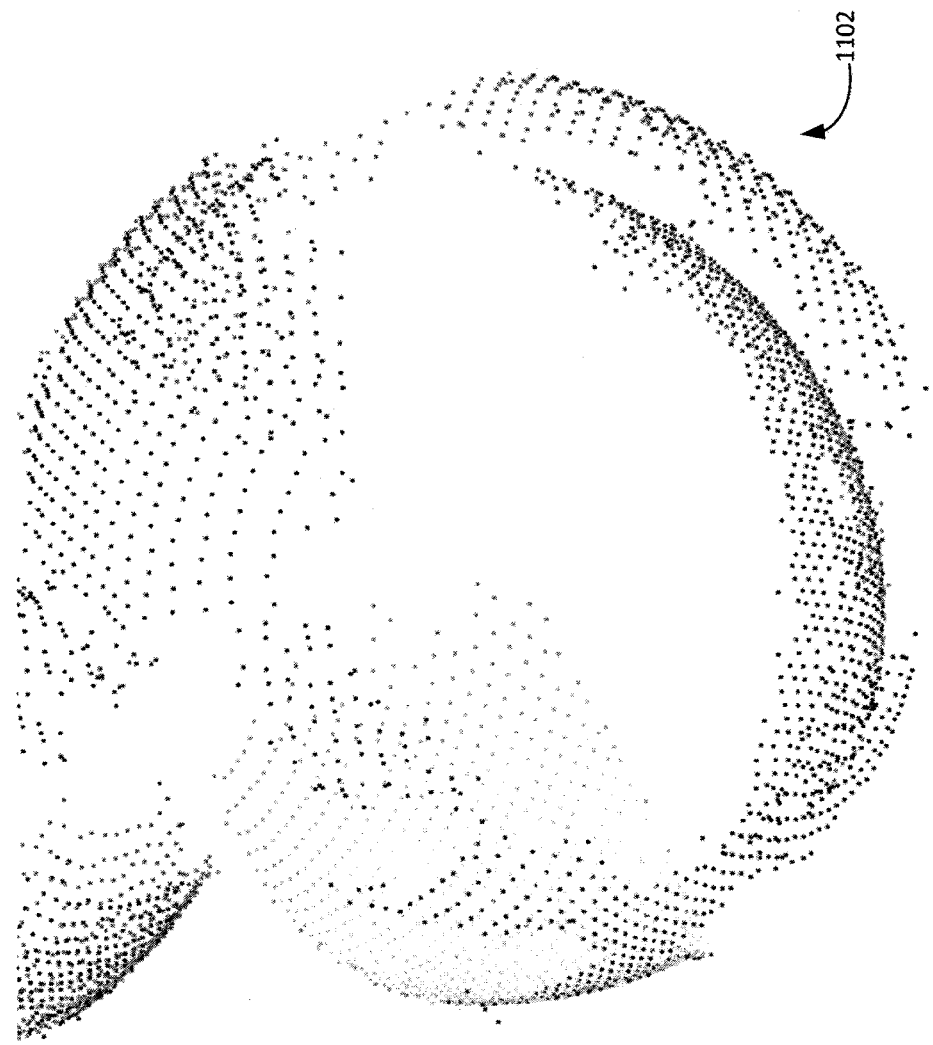
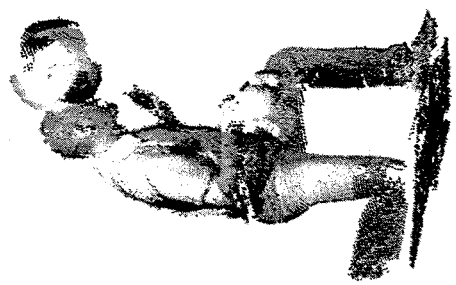
FIG. 11

TIMING PULSES IN A DEPTH SENSING DEVICE

FIELD

The present disclosure relates to depth sensing devices, more particularly, examples of the present disclosure relate to depth sensing devices that use pulsed illumination.

BACKGROUND

It is known to use depth sensing devices for various applications. One example of a depth sensing application is 3D modeling, where a real life object is scanned with a depth sensing device, and the depth information is used by a computer to construct a computerized three dimensional model of the real life object. It is also known to use active depth sensing devices for capturing depth information about a scene. Active depth sensing devices transmit or emit light onto the scene and a sensor is used to capture a reflected portion of the projected light. A decoder decodes the received signal and extracts depth information. Typically a single sample only captures a portion of the object. For example, a depth sensing device such as the one described in U.S. Pat. Nos. 8,090,194 and 8,538,166 both of which are incorporated herein by reference, have a certain field of view (FOV) and each frame that is capture by the depth sensing device covers the device's FOV. Several frames can be combined (registered) with one another to obtain an extended coverage of an imaged object.

Using two or more depth sensing devices (e.g., two, three, . . . , n 3D cameras) simultaneously has the advantage of providing broader coverage while avoiding the need to resort to dynamic registration of frame that were captured at different times. It can also shorten scanning time. Two people shooting 3D scenes together can also be a fun social endeavor. However, many depth sensing devices shoot rapid pulses of spatially or temporally coded light at the scene and process the reflected portion of the projected light to extract depth information, and when two (or more devices) active depth sensing devices operate simultaneously the pulses from the two devices can overlap in time and corrupt one another. In the field of structured light projection, this sort of corruption is sometimes referred to as "shadowing".

US Patent Application Publication No. 2013/0120636 to Baer, discloses a method for capturing an image with an image capture device, such as a camera or mobile electronic device. The method includes initiating a master-slave relationship between the image capture device and at least one secondary device. Once the master-slave relationship is initiated, remotely activating one of an at least one light source of the at least one secondary device. As the light source is activated, capturing a test image of a scene illuminated by the at least one light source by the image capture device. Then, analyzing the test image to determine if an illumination of the scene should be adjusted and if the illumination of the scene is to be adjusted, providing a control signal to the at least one secondary device including at least one of a position instruction, an intensity level, or timing data.

SUMMARY

According to an aspect of the presently disclosed subject matter, there is disclosed a method of operating a depth sensing device. According to examples of the presently disclosed subject matter, the method can include obtaining a current pulse timing on each of a first and a second depth sensing devices; and allocating an exclusive pulse timeslot to each of said first and second devices, so that during a portion of a frame which corresponds to any one of the pulse timeslots only a respective one of said first device and said second device emits a pulse.

In some examples, a buffer in between allocated timeslots can be allocated, where the buffer is associated at least with uncertainty parameters.

In further examples, allocating can include synchronizing clock generators associated with setting a pulse timing in each of said first and second devices.

Still further by way of example, allocating can include synchronizing frame timing between said first and second devices and setting a timing of a pulse on each of said first and second devices as an offset from a frame start.

Still further by way of example, a first timeslot during a frame is set substantially at a starting point of the frame, and each subsequent timeslot starts at a point which is equal to a duration of all previous timeslots plus a buffer in between any two timeslots.

Yet further by way of example the first device can serve as a master device, and the second device can be a slave. Exclusively allocating can be performed on the master device, and to the salve device can receive instructions which were sent from the master to set a pulse timing according to the pulse timeslot which was allocated to the salve device.

According to examples of the presently disclosed subject matter, the method can further include generating location instructions for the first or second device. The location instructions can be based on a target combined coverage for the first and the devices and based on which, respective target positions for at least one of the first and the second devices can be determined. The positions instructions can then be provided to at least one of the first or the second devices based on the target positions. In some examples, determining a target combined coverage can be associated with a current location of the first and second devices.

In some example, an exposure duration on each of the first and second devices can be synchronized with a respective pulse timeslot.

In yet further examples, the first and second devices can be operated resulting in respective multiple exposures during a duration of a frame (for example, a frame on the first device), where in each exposure a respective one of the first or second devices exclusively emits a pulse and exclusively collects a reflected portion of the projected pulse.

In a further aspect of the presently disclosed subject matter there is provided a depth sensing system. The depth sensing system can include a first depth sensing device and a second depth sensing device. Each one of the first and second depth sensing devices can configured to emit a pulse during an exclusively allocated portion of the frame.

In yet a further aspect of the presently disclosed subject matter, there is provided a depth sensing device. According to examples of the presently disclosed subject matter, the depth sensing device can include a projector and a processor. The projector can be capable to emit a pulse of light. The processor can be configured to receive instructions to adapt pulse timing in said projector according to a pulse timeslot that was exclusively allocated to the depth sensing device, wherein the timeslot that was exclusively allocated to the device is coordinated with at least one more timeslot that was exclusively allocated to at least one other depth sensing device, such that during a frame of the depth sensing device is configured to emit a pulse during an exclusively allocated portion of a frame of the depth sensing device, and the at least one other device is also configured to emit a pulse during a different exclusively allocated portion of the frame.

In a further aspect of the presently disclosed subject matter there is provided a method of operating plurality of depth sensing devices. According to examples of the presently disclosed subject matter, the method can include: setting a frame rate of a slave depth sensing device so that it is different than a frame rate of a master device; detecting a frame in which a full overlap between a pattern projected by the slave device and a pattern projected by a master depth sensing device occurs; and operating the slave device at a frame rate that is different than the frame rate of the master device until a predefined interval between a timing of frames on the master and on the slave devices is reached, and setting a frame rate of the slave device to a frame rate that is equal to a frame rate on the master device.

BRIEF DESCRIPTION OF THE DRAWINGS

In order to understand the invention and to see how it may be carried out in practice, certain embodiments of the invention will now be described, by way of non-limiting example only, with reference to the accompanying drawings, in which:

FIG. 11 shows a point cloud that was generated by combining the point clouds generated by a single depth sensing device over a plurality of frames, where the depth sensing device was used to scan a person tossing a beach ball, according to examples of the presently disclosed subject matter;

Figure 1:
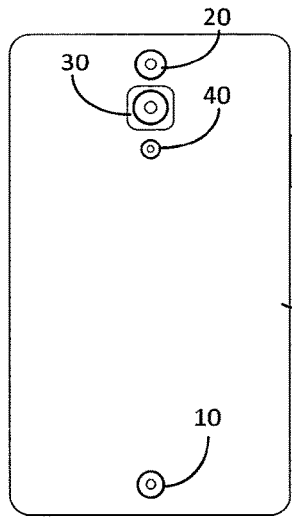
FIG. 1 is a graphical illustration of a smart phone having a depth sensing device disposed on a back face side of the smart phone.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

GENERAL DESCRIPTION

Many of the functional components of the presently disclosed subject matter can be implemented in various forms, for example, as hardware circuits comprising custom VLSI circuits or gate arrays, or the like, as programmable hardware devices such as FPGAs or the like, or as a software program code stored on an intangible computer readable medium and executable by various processors, and any combination thereof. A specific component of the presently disclosed subject matter can be formed by one particular segment of software code, or by a plurality of segments, which can be joined together and collectively act or behave according to the presently disclosed limitations attributed to the respective component. For example, the component can be distributed over several code segments such as objects, procedures, and functions, and can originate from several programs or program files which operate in conjunction to provide the presently disclosed component.

In a similar manner, a presently disclosed component(s) can be embodied in operational data or operation data can be used by a presently disclosed component(s). By way of example, such operational data can be stored on tangible computer readable medium. The operational data can be a single data set, or it can be an aggregation of data stored at different locations, on different network nodes or on different storage devices.

The method or apparatus according to the subject matter of the present application can have features of different aspects described above or below, or their equivalents, in any combination thereof, which can also be combined with any feature or features of the method or apparatus described in the Detailed Description presented below, or their equivalents.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures and components have not been described in detail so as not to obscure the presently disclosed subject matter.

Unless specifically stated otherwise, as apparent from the following discussions, it is appreciated that throughout the specification discussions various functional terms refer to the action and/or processes of a computer or computing device, or similar electronic computing device, that manipulate and/or transform data represented as physical, such as electronic, quantities within the computing device's registers and/or memories into other data similarly represented as physical quantities within the computing device's memories, registers or other such tangible information storage, transmission or display devices.

Provided below is a list of conventional terms in the field of image processing and in the field of digital video content systems and digital video processing. For each of the terms below a short definition is provided in accordance with each of the term's conventional meaning in the art. The terms provided below are known in the art and the following definitions are provided as a non-limiting example only for convenience purposes. Accordingly, the interpretation of the corresponding terms in the claims, unless stated otherwise, is not limited to the definitions below, and the terms used in the claims should be given their broadest reasonable interpretation.

Examples of the presently disclosed subject matter relate to a depth sensing device, and to a method of setting a pulse timing in a depth sensing device. Also disclosed is a system which includes a plurality of depth sensing devices forming a multi-device coordinated depth sensing group, and a method of coordinating pulse timing in a multi-device coordinated depth sensing group. In particular, examples of the presently disclosed subject matter relate to depth sensing technology and devices which rely on projection of pulsed coded light. A coordinated pulse timing scheme is generated for the devices in a multi-device coordinated depth sensing group to prevent any member of the group from interrupting with the projection of the pulse by any other member of the group. Furthermore, the pulse timing scheme enables a tight pulse train across the multiple devices in the multi-device coordinated depth sensing group, which enables accurate and motion tolerant multi-perspective depth extraction. In still further examples, the pulse timing scheme is based on a coordinated pulse, so that the interruption-free and coordinated pulsing scheme is repeated at each frame. In some cases the timing of frames can be synchronized across the plurality of devices participating in a coordinated depth sensing session.

Examples of the presently disclosed subject matter also contemplate providing positioning instructions to members of a multi-device coordinated depth sensing group. For example the positioning instructions can be used to obtain an extended coverage of an object within a scene. Further aspects of the presently disclosed subject matter relate to various user interface features which provide a user of a depth sensing device with information regarding a coordinated depth sensing session and/or about a coordinated multi-device depth sensing group and/or about members of the group. In further examples of the presently disclosed subject matter, user interface controls are provided for enabling a user of a depth sensing device to interact with the depth sensing device and/or with other members of a multi-device coordinated depth sensing group and/or to control various features of a collaborative depth sensing session.

As mentioned above, examples of the presently disclosed subject matter relate to a depth sensing device, and to a method of setting a pulse timing in a depth sensing device, and further examples relate to a multi-device coordinated depth sensing group. The depth sensing device(s) in examples of the presently disclosed subject matter use active depth sensing technology and include components which are used in active depth sensing.

The term "active depth sensing" relates to depth sensing technologies which rely on a projection of coded light onto a scene, capture a reflected portion of the projected coded light and process the captured signal to extract depth information. Active depth sensing technologies include time of flight ("TOF") and structured light depth sensing technologies. TOF depth sensing relies on temporal coding of the light and structured light depth sensing applies spatial domain coding to the transmitted (or emitted) light. Structured light encoding and decoding method are disclosed by way of example in U.S. Pat. No. 8,090,194 and in U.S. Pat. No. 8,538,166 which are hereby incorporated by reference in their entirety. U.S. Pat. No. 2016/0191867 provides an example of one possible design for a structured light projector. In the following description, various examples reference structured light depth sensing technology. It should be noted however, that such examples are non-limiting, and that the examples provided in the present disclosure also apply mutatis-mutandis to other types of active depth sensing technologies which use coded light pulses to obtain depth information about a scene.

Figure 2:
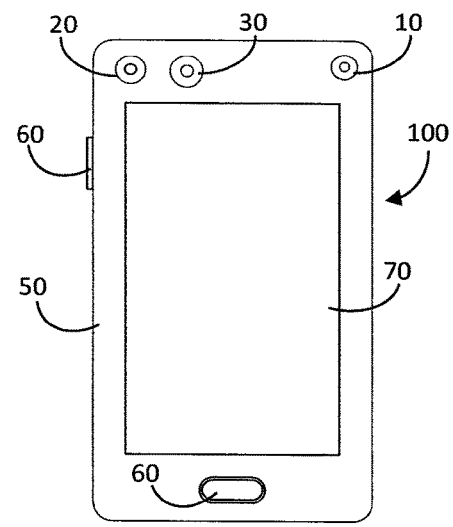
FIG. 2 is a graphical illustration of a smart phone having a depth sensing device disposed on a front face side of the smart phone.
Figure 3:
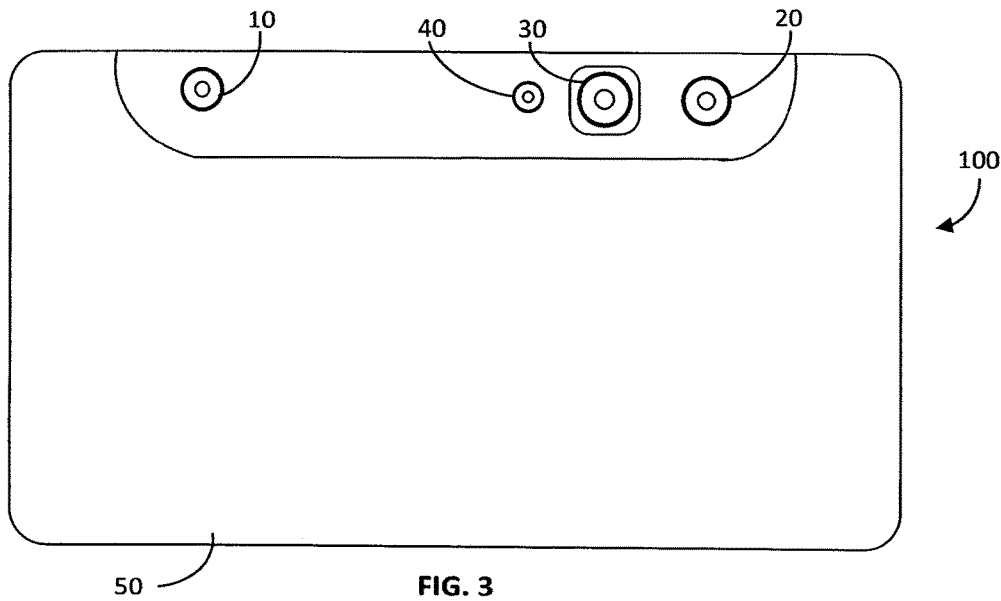
FIG. 3 is a graphical illustration of a tablet having a depth sensing device disposed on a back face side of the tablet, all of which are examples of the presently disclosed subject matter.
Figure 4:
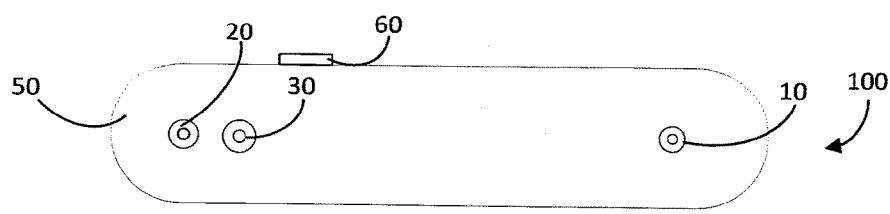
FIG. 4 is a graphical illustration of a dedicated depth sensing device, according to examples of the presently disclosed subject matter.

Reference is now made to FIGS. 1-4, which provide a graphical illustration of an appearance, from various perspectives, and in various form configuration and form factors of examples of depth sensing devices. FIG. 1 is a graphical illustration of a smart phone having a depth sensing device disposed on a back face side of the smart phone; FIG. 2 is a graphical illustration of a smart phone having a depth sensing device disposed on a front face side of the smart phone; FIG. 3 is a graphical illustration of a tablet having a depth sensing device disposed on a back face side of the tablet, all of which are examples of the presently disclosed subject matter; and FIG. 4 is a graphical illustration of a dedicated depth sensing device. It would appreciated that other configurations of depth sensing device are possible.

A depth sensing device 100 typically includes a projector 10, a depth sensor 20 and an image sensor 30. An example of a depth sensing device is the Aquila Tablet developed by Mantis-Vision Ltd. of Petah Tikva, Israel and the Project Tango tablet, which was released as part of a development kit by Google Inc. of Mountain View, Calif. The project Tango tablet was released in two versions, the first version is an active stereo version incorporating, inter-alia a structured light projector and a decoder which is capable of decoding an image of a reflected portion of a projected bi-dimensional bi-tonal pattern, both of which were developed by Mantis-Vision Ltd., and the second version is a time of flight version which is based on technology that was developed by Pmd Technologies GMBH of Siegen, Germany. Other examples of active depth sensing technologies include the two versions of the Kinect™ depth sensing device which is/were sold by Microsoft™ of Redmond, Wash. The earlier version of the Kinect™ was based on structured light projection, and the later version is time of flight base. The hardware and/or software of the depth sensing device 100 can be similar to the hardware and/or software implemented in either version of the Tango tablet, in the Aquila tablet, in either version of the Kinect™ or in various other commercially available active depth sensing devices and the hardware and software components of an active depth sensing device are described here in general, high level terms.

The projector 10 typically emits invisible light, such as IR light or light in the near IP (NIR) band. It would be appreciated that the projector 10 and the depth sensor 20 can operate at any wavelength band so long as the coded light emitted by the projector 10 is detectable by the depth sensor 20 and can be distinguished from ambient light. The image sensor 30 is typically an image sensor possibly with some filters and is capable of sensing a reflected portion of the light projected by the projector 10. The image sensor 30 can be used to record visible light images. In many depth sensing applications, depth information and (visible light) images are combined, for example, to provide a 3D model of an object with which the depth information is associated. In some configurations, and for specific applications, a depth sensing device 100 can be constructed without the image sensor 30.

The projector 10, depth sensor 20 and image sensor 30 can be positioned at various possible locations on a device. The position and orientation of the projector 10 and of the depth sensor 20 can determine the coverage of FOV of the depth sensing function of the device. In some depth sensing devices, the signal that is provided by the image sensor 30 can also be used to extract depth information or can be otherwise combined with the depth information (e.g., in color projection). In such cases the positions and orientation of the image sensor 30 can also affect the depth information of the representation of the depth information. According to examples of the presently disclosed subject matter, calibration information which is associated with the position and orientation of the projector 10, the depth sensor 20 and possibly also of the image sensor 30 can be stored in the device 100 and can be used in the depth extraction process and other processes which require such calibration information. The calibration process can be repeated from time to time, as a matter of routine or in response to some event (e.g., a significant shock) to maintain or regain calibration.

The projector 10 is configured to emit the coded light in pulses and the depth sensor 20 collects the reflected portion of the projected light during an exposure period. The pulse and exposure operations are repeated many times a second. This cycle is called a frame. For example, the pulse and exposure duration can be in the order of 2 milliseconds (for global shutter sensors) and the frame rate can be 30 frames per second. In many places throughout the description the pulse emission period and the exposure period are referred to explicitly or implicitly as being concurrent. Concurrent pulse emission and exposure periods are applicable to some types of depth sensing configurations and components, for example, to depth sensing devices which include a global shutter sensor. However, the disclosure is not limited to such depth sensing devices and configurations and in other cases the pulse emission period and the exposure period are not concurrent. One such example, is a depth sensing device which uses a rolling shutter and where the pulse period coincides with only a portion of the exposure duration. For example, in a depth sensing device which uses a rolling shutter the pulse period may coincide (only) with the portion of the exposure during which all the sensor lines are exposed (or when at least a certain percentage of the sensor is exposed). The coordination of pulses in such devices can take into account the exposure duration of each device, as will be described in further detail below.

The depth sensing device optionally also includes a visible light flash 40 which can be used in cooperation with the image sensor 30 for capturing images under low light conditions. The depth sensing device 100 can also include a display 70, buttons 60 and any other user interaction mechanism.

A member of multi-device depth sensing group can take the form of any one of the devices shown in FIG. 1-4 or any can be any other depth sensing device which uses pulsed coded light projection to obtain depth information about a scene.

Figure 5:
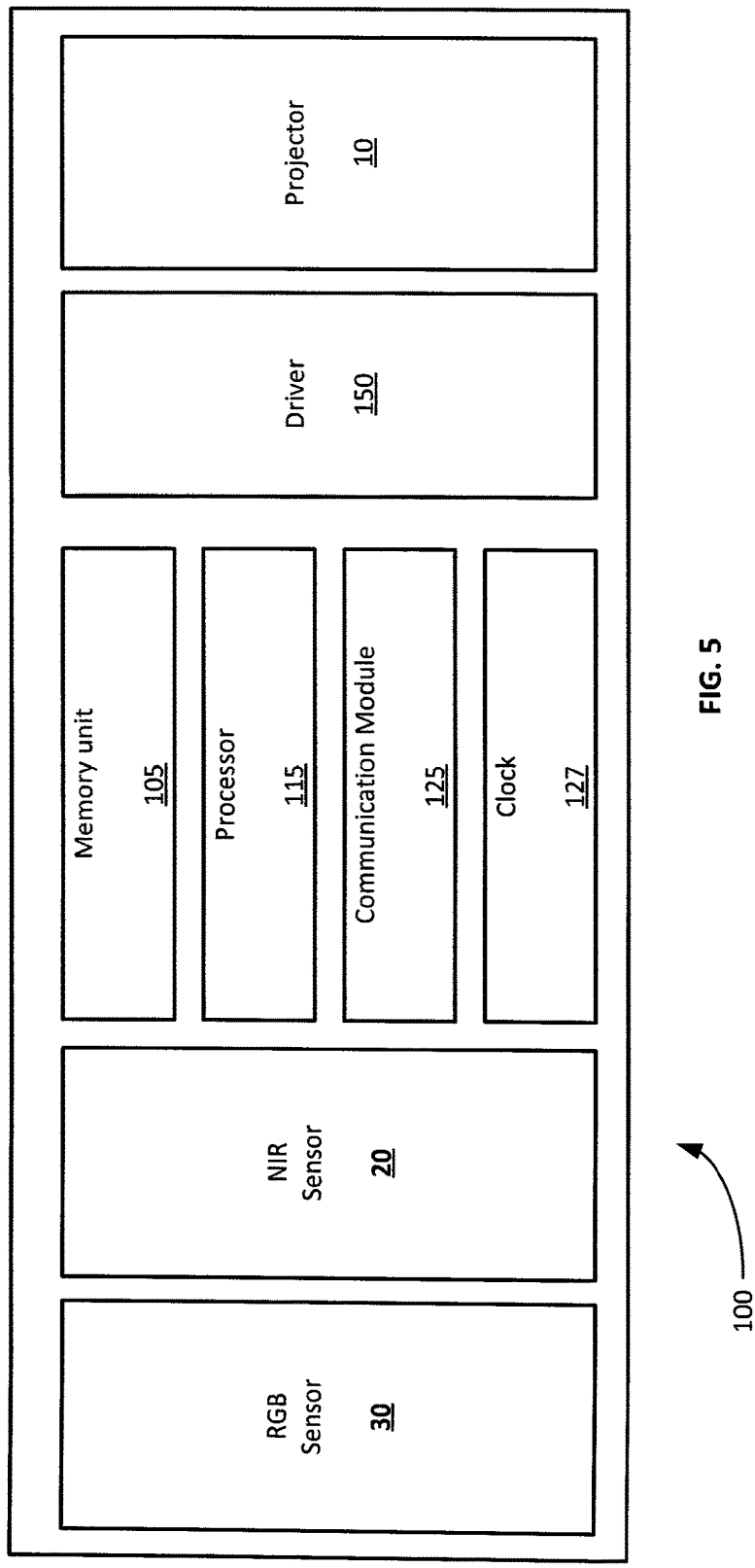
FIG. 5 is a block diagram illustration of main components of a depth sensing device, according to examples of the presently disclosed subject matter.

Reference is now made to FIG. 5, which is a block diagram illustration of main components of a depth sensing device, according to examples of the presently disclosed subject matter. According to examples of the presently disclosed subject matter, a depth sensing device 100 can include the projector 10, depth sensor 20 and image sensor 30, all of which were mentioned above, as well as a driver 150, a memory unit 105, a processor 115, a communication module 125 and a clock generator 127.

The driver 150 is configured to provide the power need for the operation of the projector 10. By controlling the power that is used to drive the projector 10, and specifically the light source in the projector 10, various aspects of the operation of the projector and its output can be modified and controlled. The driver 150 can work in cooperation with the processor 115.

The memory unit 105 can be configured to store computer program code and other digital data. The memory unit 105 can store the computer program code that is used to operate the projector 10 (including the pulsing of the projector), collect signal which correspond to a reflected portion of the light projector by the projector 10, decode the signals generated by the depth sensor 20, and extract depth information therefrom. The memory unit 105 can also store data and information that is generated by or used in the depth sensing process, such as a depth map or a point cloud, as well as any other information that is used in the depth sensing device 100 or by any of its components, and any information that is generated by the device 100 or its components. The memory unit 105 can also be used to store the program code and any protocol specifications which are used in the process of setting a pulse timing on the depth sensing device 100, and initiating and managing a coordinated depth sensing session in the device 100. In some configurations the memory unit 105 can also store program code and any protocol specifications which are used for establishing a multi-device coordinated depth sensing group and for managing the group, including determining and setting the pulse timing on members of the group.

The processor 115 is configured to process data for operating the device 100 components as necessary. The processor 115 can be configured to get data from the various components of the device, including from the memory unit 105, process the data and provide instructions to various components of the device 100 for controlling their operation. The processing unit 115 can also be configured to use the communication module 125 to send and/or receive instructions from the device 100 to other members of a multi-device coordinated depth sensing group and/or from another member of a multi-device coordinated depth sensing group to the device 100.

According to examples of the presently disclosed subject matter, the processor 115 can be configured to run the program code that is stored in the memory 105 unit. The processor 115 runs various operations itself and can manage operations running on other components of the depth sensing device 100 as well as coordinating and participating in data exchanges both within and outside the device 100 (with external entities), including for setting a pulse timing (and accordingly adapt the exposure timing) in the depth sensing device 100 itself and possibly other operations which are part of or associated with setting up a multi-device coordinated depth sensing group and implementing a coordinated pulse timing scheme on each member of the group. In some examples of the presently disclosed subject matter, the processor 115 can also be configured to adjust other temporal properties of pulses and/or exposures in the device 100, such as the pulse/exposure duration, etc.

As mentioned above, as part of setting up or implementing a coordinated pulse timing scheme, the timing of a pulse in a depth sensing device can be adjusted in coordination with other members of a multi-device coordinated depth sensing group. The processor 115 can also be configured to adjust the frame rate or the frame duration and other temporal properties related to a frame.

In still further examples of the presently disclosed subject matter, in connection with the changes to certain settings related to the pulse, the exposure and possibly also the frame on the device 100, the processor 115 can be configured to preform changes to other attributes and/or configurations of components of the device. Such changes may be necessary to facilitate or balance the modification(s) related to the pulse, the exposure and possibly also the frame. For example, in case a pulse duration is changed (shorter pulses) the drive current that is applied to the light source in the projector 10 can be modified in order to balance the modified illumination duration. For convenience, in the following description references to changes to the timing of a pulse, exposure or frame includes (as an option) changes to pulse, exposure or frame duration, and (as a further option) changes which facilitate or balance the changes to the timing or duration of pulse, exposure or frame.

According to examples of the presently disclosed subject matter, the modifications of the pulse and exposure timing and possibly also the frame timing, and if applicable also the complimentary modifications mentioned above can be associated with a coordinated pulse timing scheme. The coordinated pulse timing scheme can be initiated by the device 100, in which case, the modification can be can be performed in response to instructions received from the device's 100 own processor 115. The device 100 can act as a master or coordinator of a multi-device coordinated depth sensing group, and the processor 115, e.g., through the communication module 125, can distribute instructions to one or more other members of the forming group to modify their pulse and exposure timing and possibly also the frame timing, and if applicable, also instructions to make complimentary modifications which are associated with the coordinated pulse timing scheme. In further examples, only timing instructions are issued by a coordinating entity (which can be one of the members of the group or some other entity), and any modifications which are necessary to support the modifications which are applied by each device in connection with the timing instructions are determined and executed by the device internally.

In other examples, the timing scheme can be initiated outside the device 100. For example, the device 100 can receive, e.g. through the communication module 125, instructions for modifying the pulse and exposure timing and possibly also the frame timing. The instructions can arrive at the device 100 from another depth sensing device which is establishing (and may act as a coordinator or master) a multi-device coordinated depth sensing group. In response to the instructions, the processor 115 can modify the pulse and exposure timing and possibly also the frame timing, and if applicable also the complimentary modifications which are associated with modifying the pulse and exposure timing and if applicable also the frame timing. In further examples, only timing instructions are received at the device 100 (from a coordinating entity), and any modifications which are necessary to support the modifications that are applied within The processor 115 can also be configured to decode the signal obtained by the depth sensor 20 to extract the depth information. The processor 115 can be adapted to run other routines which are necessary for active depth sensing, such as a field-calibration process (also referred to sometimes as auto-calibration), registration etc.

Any type of device that has processing capabilities and capabilities to issue and/or implement instructions can be used in the device 100. For example multi-core processors, processing arrays or distributed processing entities can be used.

According to examples of the presently disclosed subject matter, the clock generator 127 signals are used to determine the pulse timing and duration exposure timing and duration, and possibly also the frame timing and duration (or the frame rate) and any interval between pulses, exposures and frames. The exposure timing and the pulse timing can be substantially simultaneous and can share the same clock timing (or almost the same clock timing). In some cases, there can be several clock generators in a device 100. One clock generator can depend on another, while other clock generators are depend one at least one other clock generator (asynchronous). The processor 115 can have its own internal clock generator. For simplicity, the description assumes that the timing of the pulses in the depth sensing device 100 (and exposure timing and possibly also the frame timing) is set by clock generator 127, and that the timing of the pulses (and exposure timing and possibly also the frame timing) can be adjusted by programming clock generator 127, or by modifying the timing of the pulses in the depth sensing device 100 (and exposure timing and possibly also the frame timing) based on the clock signal generated by clock generator 127, and no other clock generators 127 are involved. It should be noted however, that in certain depth sensing devices, and in some configurations, it may be necessary to coordinate more than one clock generator in a given device, and that the timing of the pulses (and exposure timing and possibly also the frame timing) may be associated with more than one clock generator.

In examples of the presently disclosed subject matter, the processor 115 can read the clock generator's 127 signal (as mentioned above, this can be an internal clock generator of the processor). The firing of the pulse and the exposure timing, and possibly also the timing of frames in the device 100 can be set according to the clock generator 127. The processor 115 can control the timing when the projector 10 emits pulses and the exposure timing, and possibly also the timing of frames in accordance with a coordinated pulse timing scheme. The processor 115 can be configured to adjust the timing of the pulses and the exposure timing, and possibly also the timing of frames in response to instructions that were issued in accordance with the coordinated pulse timing scheme. Other attributes or configurations can also be modified in the device based on the instructions or in connection with the modified pulse, exposure or frame timing or duration.

The instructions to adjust the timing of emitting the pulse and the exposure timing, and possibly also the timing of frames can originate in the device 100. In this case, the processor 115 can set the local timing of the pulses (and exposure timing and possibly also the frame timing) and can also issue instructions for one or more other members of a multi-device coordinated depth sensing group to adjust their own timing, so that pulse timing is coordinated across all members of the group. In another example, the processor 115 can set the local timing of the pulses (and exposure timing and possibly also the frame timing) and can also issue instructions for other members the group to adjust their own timing, so each member of the group has an exclusively allocated pulse timeslot during each frame, which enables a plurality of exposures during a single frame by the multiple devices in the group. The term frame as it is used here to describe the time duration which spans a pulse emission and exposure cycle. Each device in the group repeats the pulse emission and exposure operations at a certain rate. According to the coordinated pulse timing scheme of examples of the presently disclosed subject matter, the plurality of coordinated pulses (and exposures) are fired (at exclusively allocation timeslots) during a single frame, where the duration of a frame is the time interval in between two consecutive pulses (and exposures) on one of the members of the group. For example, the plurality of coordinated pulses (and exposures) are fired (at exclusively allocated timeslots) during a single frame of the device which is the first member (or the $n^{th}$) from among the group members to fire its pulse. In another example, the plurality of coordinated pulses are fired during a single frame, where the duration of a frame is the time interval in between two consecutive pulses in a master device which coordinated the pulses across the group members. It would also be appreciated that each exclusively allocated timeslot corresponds to a different portion of the frame. In some cases, the timing of such frame can be synchronized across all members of a multi-device depth coordinated depth sensing group. In other cases the frames are not synchronized. In cases where the frames timing are not synchronized, the coordination of the pulses timing across different member of a multi-device coordinated depth sensing group can be achieved by offset the frames (or the frame start point), such starting with the second group member's frame, each device's frame start point is offset from the frame start point of a previous device by some buffer in between any two pulses. The result is that the timing of each pulse can be substantially equal, relative to the frame start time in the first device in the group to fire its pulse, to the pulse duration of all previous members of the group, with the addition of a buffer in between any two previous devices in the group.

The frame can be synchronized across all member of a multi-device coordinated depth sensing group, in which case a frame is the to which reference is made here is a frame one When an external entity issues the timing instructions based on the coordinated pulse timing scheme (such as when the master is another member of the group, or when peer-to-peer coordination is implemented), the instructions may be received through the communication module 125, passed on to the processor 115, and the processor 115 in cooperation with the clock 127 can adjust the pulse timing (and exposure timing and possibly also the frame timing) in accordance with the instructions.

The pulse timing instructions (which can also involve or imply instructions regarding exposure timing and possibly also frame timing, or such instruction can be separate) can follow a coordinated pulse timing scheme setup routine or a handshake. As part of the setup routine data can be obtained from or exchanged between members of a forming multi-device coordinated depth sensing group. The data can include a current pulse timing, and possibly also exposure timing and possibly also frame timing (and the durations thereof). The data can also include data with regard to the configurations, capabilities or components used in the device. The data can include a position of the device, and various other indications with regard to a current status or condition of the device, its components, configurations or the device's environment.

The timing instructions can be addressed to a specific device or to a group of devices (e.g., to the specific members of the now forming multi-device coordinated depth sensing group), or the instructions can be transmitted to non-specific recipients. In one example, there may be a limit on the number of members in a multi-device coordinated depth sensing group, and the first one's to join the group are included in the group and any device which attempts to join the group after the group is full is declined or is simply unsuccessful. In other examples, setup routine and/or the operation of the multi-device coordinated depth sensing group is limited by the range of the communications that are used to form and manage the group. For example, when close range communications are used to setup or operate the group, such as Bluetooth or NFC, or devices within the range of the communications (and which have been successfully paired) can cooperate in a multi-device coordinated depth sensing group. Various other criteria can be used to select which devices can join or participate in a multi-device coordinated depth sensing group.

The pulse timing instructions which are used to set the timing of the pulses according to a coordinated pulse timing scheme may be general and each member of the group can implement the general instructions, or in another example, the instruction can be addressed specific to a device (one of the members of the group), and by implementing the specific instructions on each respective device, the pulse coordination across all members of the group is achieved. In case the instructions are addressed to a certain member of the group, the instructions can include an identifier or a network address of the member to which they are addressed.

The pulse timing instructions (which can also involve or imply instructions regarding exposure timing and possibly also frame timing) may require interaction with an operator of the device to which they are addressed. The requirement that the operator is involved can be included in the instructions or can be added by the configurations of the device which receives the instructions. The operator may also be capable of transmitting a response to the instructions, and in some examples, the instructions may be adapted according to the operator's response and new instructions can be received following the update.

Setting the pulse timing (and exposure timing and possibly also the frame timing), can involve synchronizing clocks across all members of a multi-device coordinated depth sensing group, and possibly also modifying or programming a clock on one or more of the devices.

According to examples of the presently disclosed subject matter, in addition to the timing instructions, the processor 125 can also be configured to provide instructions related to a location of the device 100, and in case the device is a master or coordinator in a multi-device coordinated depth sensing group, the processor 125 can also generate and communicate (e.g. through communication module 127) location instructions to other member of the group.

According to examples of the presently disclosed subject matter, during an ongoing depth sensing session which involves multiple coordinated depth sensing devices, the coverage, location and/or orientation of each device relative to a scene, relative to an object of interest, or relative to each other can be determined. Determining the coverage, location and/or orientation of a depth sensing device can be achieved in various ways. In one example, a target combined coverage for two or more members of a multi-device coordinated depth sensing group can be obtained or determined. The target combined coverage can relate to a specific scene or object or it can be a more abstract representation of coverage, such as the angle of the combined FOV, for example. Based on the target combined coverage, positioning (or orientation, etc.) instructions can be provided to at least one of the two or more members of the group.

In one example, the positioning instructions, and possibly also the target combined coverage can be associated with a current location of the two or more members of the group.

One possible (and non-limiting) process which can be used to determine the coverage, location and/or orientation (and what overlap there is) of two or more depth sensing devices can involve processing 2D images which are captured by the image sensor 30 of the depth sensing devices. In one example, the 2D images from two (or more) devices are processed to detect matching features in the images. Since the image sensor 30 is calibrated to the depth sensor 20 (and possibly also to the projector 10) in each device, when matching features are located in images from two (or more) devices the relative coverage of the devices can be evaluated. In addition or as an alternative to the image processing approach, sensors onboard the depth sensing devices, such as GPS, INS, etc. can be used to determine a current location, orientation, angle etc. of a device and its movement from a previous known location. The optical properties or configurations of the depth sensing components and the imaging components in each device can also be used to determine the location and/or the coverage of a depth sensing device.

In one example, the processor 115 can execute and run the process of determining the coverage, location and/or orientation of at least one other member of the multi-device coordinated depth sensing group. This may be the case, for example, when the device 100 acts as a master or coordinator in the group. In other examples, the coverage, location and/or orientation determination is not necessarily carried out on the master device, and can be performed by any member of the group. The process can also be divided or shared between some or all of the members of the group.

The processor 115 can obtain any information that is necessary to determine its own coverage, location and/or orientation and the coverage, location and/or orientation of one or more other members of the group. As mentioned above, this can include 2D images, signals from location and/or orientation sensors and data about the optical properties or configurations of depth sensing components and imaging components used in the devices. The processor 115 then determines a current coverage, location and/or orientation either in absolute terms or in relative terms. Based on the current coverage, location and/or orientation and possibly also by anticipating a future coverage, location and/or orientation (based on motion tracking, for example), the processor 115 can issue instructions regarding a future coverage, location and/or orientation of the depth sensing device 100, or instructions for one or more other members of the group, which will be relayed to such other members through the communication module 127.

A depth sensing device which receives coverage, location and/or orientation instructions from another device act one the instructions to change its coverage, location and/or orientation according to the instructions. For example, upon receiving coverage, location and/or orientation instructions, the processor 115 of the device 100 can be configured to display on a display of the device 70 indications for an operator to change the coverage, location and/or orientation, for example by moving at a certain direction, or changing the orientation of the device 100 or the depth sensing components relative to a scene or relative to an object within the scene. The indications on the display can take on the form of arrow pointing in a certain direction, graphical markers placed on an image of an object of interest, etc. In addition or as an alternative to the visual indication, any other form of indications can be used including using audio, using vibrations etc. for guiding an operator to achieve a desired coverage, location and/or orientation.

In other cases, for example, when the device 100 is mounted on a motorized platform, the processor 115 can issue digital commands to components of the device or to the motorized platform which carries the device 100 based on the coverage, location and/or orientation instructions, and cause the components of the device to change the coverage, location and/or orientation of the device or its depth sensing components according to the instructions it received.

It should be noted that the process of determining the coverage, location and/or orientation can be implemented on each member of a multi-device coordinated depth sensing group, on just one of the devices (the one serving as master or coordinator) or on a separate device (a central unit) which is not a depth sensing device.

The communication module 125 is used to enable the depth sensing device 100 to communicate with external resources, such as with other depth sensing devices. The communication module 125 can send and/or receive instructions for operating the device 100 and/or for operating other depth sensing devices (e.g., other members of a coordinated multi-device depth sensing group). The sent and/or received instructions can include for example instructions for setting a projector's 10 pulse timing. It would be appreciated that the pulse timing can be set by an internal clock generator of the projector 10 or by any other clock generator of the device 10 and the instructions can relate to any relevant clock. Also, different devices can have different configuration for setting the timing of the projector 10, and the program which is used to set the pulse timing locally and/or on other member of a multi-device coordinated depth sensing group can be capable of determining what instructions to issue and to which clock generator for achieving a desired pulse timing on each member of a multi-device coordinated depth sensing group, or for setting locally the timing of pulses according to instructions received from another member of a multi-device coordinated depth sensing group.

The communication module 125 can be configured to use any one or a plurality of communication protocols (and can incorporate several modems to support any such protocol), including: RF signaling, near field communication (NFC), Bluetooth, Wifi, Wireless USB, Infrared signals, and any wired communication protocols (such as Ethernet for example).

The device 100 can also include a user interface (not shown), such as a touchscreen, a microphone, speakers, etc. and tactile switches or buttons, speakers, a microphone, bio-feedback sensor, etc. to allow a user-device and device-user interaction. The user can utilize the user interface(s) to modify certain operations involved in the setting up and managing a multi-device coordinated depth sensing group and to setup and control a coordinated depth sensing session that is implemented by such a group. For example, in a group where one of the devices serves as a master or coordinator device, the user may issue instructions to the other devices (which are slaves) through interaction with a display on a touchscreen of the master device.

As will be described in further detail below, in a multi-device coordinated depth sensing group one device may serve as a master and the other devices are slaves. The master device can have the same configuration as the slave device(s), or in other implementations some differences may exist between the master and the slave, for example, the slave devices may not have a display. A certain device can serve a master in one coordinated depth sensing session and as a slave in another session.

Figure 6:
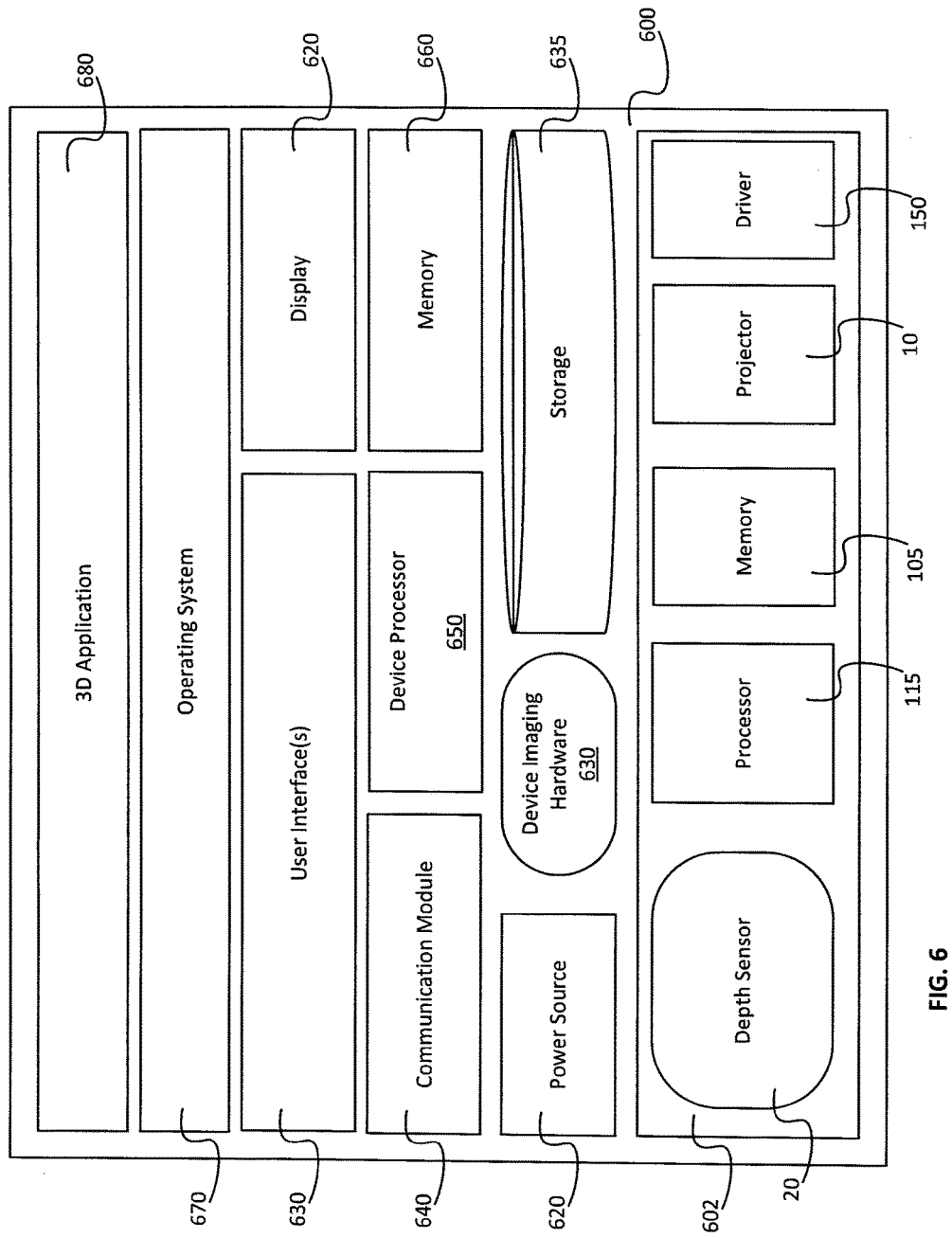
FIG. 6 is an illustration of an example of a configuration of a depth sensing device, which includes generic computer hardware and where a depth sensing block is incorporated and integrated into the device, according to examples of the presently disclosed subject matter.

The depth sensing device shown in FIG. 5 and described above with reference thereto can be implemented as a dedicated depth sensing device, or as a block or subsystem in a device or system which also includes other components and is intended for additional uses. For example, the devices that were shown in FIGS. 1-3 are mobile computer platforms which incorporate a depth sensing block. The platform can be either general purpose or can be intended for some specific use or uses. In FIG. 6, to which reference is now made, there is shown an example of a configuration of a device 600 which includes generic computer hardware and where a depth sensing block 602 is incorporated and integrated into the device 600, according to examples of the presently disclosed subject matter. The depth sensing device 600 in FIG. 6 can be a smartphone, a tablet a notebook computer, a personal computer, a gaming console, virtual reality goggles, a dedicated depth sensing utility, a professional utility incorporating a depth sensing unit, etc.

In the configuration shown in FIG. 6 by way of example, the depth sensing block 602 includes the projector 10, the depth sensor 20, the memory 105 the processor 115 and the driver 150 which were described above with reference to FIGS. 1-4 and FIG. 5. In the configuration shown in FIG. 6, the RGB sensor 30 (or the sensor that is used for capturing visible light images) is implemented as part of the device imaging hardware 630, outside the depth sensing block 602, and the communication module 640 is also implemented outside the depth sensing block 602.

According to examples of the presently disclosed subject matter, in the addition to the depth sensing block 602 and its components, the depth sensing device 600 can also include, a power source 620, storage 635, a communication module 640, a device processor 650 and memory 660, device imaging hardware 630, a display unit 620, and other user interfaces 630. Also shown in FIG. 6 is an operating system 640 that is used to operate the depth sensing device 600 and any of its components. The depth sensing block 602 and any of its components can be operatively connected to any component of the depth sensing device 600, and different components can work together to perform a common operation.

It should be noted that in some examples of the presently disclosed subject matter, one or more components of the depth sensing device 600 can be implemented as distributed components. In such examples, a certain component can include two or more units distributed across two or more interconnected nodes. Further by way of example, a computer program, possibly executed by the device processor 650, and possibly being a part of the operating system 670, can be capable of controlling the distributed component and can be capable of operating the resources on each of the two or more interconnected nodes.

It is known to use various types of power sources in a mobile communication device. The power source 620 can include one or more power source units, such as a battery or batter cells, a short-term high current source (such as a capacitor), a trickle-charger, etc.

The device processor 650 can include one or more processing modules which are capable of processing software programs. In this description, the device processor 650 may include different types of processors which are implemented in the computerized platform 600, such as a main processor, an application processor, etc. The device processor 650 or any of the processors which are generally referred to herein as being included in the device processor can have one or more cores, internal memory or a cache unit.

The storage unit 635 can be configured to store computer program code that is necessary for carrying out the operations or functions of the mobile communication device 100 and any of its components. The storage unit 635 can also be configured to store one or more applications, including 3D applications 680, which can be executed on the computerized platform 600. In a distributed configuration, one or more 3D applications 680 can be stored on a remote computerized device, and can be consumed by the mobile communication device 600 as a service. In addition or as an alternative to application program code, the storage unit 635 can be configured to store data, including for example depth information that is provided by the depth sensing block 602.

The communication module 640 can be configured to enable data communication to and from the depth sensing device 600. By way of example, examples of communication protocols which can be supported by the communication module 600 include, but are not limited to cellular communication (3G, 4G, etc.), wired communication protocols (such as Local Area Networking (LAN)), and wireless communication protocols, such as Wi-Fi, wireless personal area networking (PAN) such as Bluetooth, etc. The communication module 640 can implement various synchronization protocols to set the timing locally or on remote device which are part of multi-device coordinated depth sensing group.

It should be noted that that according to some examples of the presently disclosed subject matter, some of the components of the depth sensing block 602 can be implemented on the depth sensing device hardware resources. For example, instead of having a dedicated processor 115, the device processor 650 can be used for preforming the data processing tasks required for the operation of the depth sensing block 602. Still further by way of example, the depth sensing device 600 can include more than one processor and more than one type of processor, e.g., one or more digital signal processors (DSP), one or more graphical processing units (GPU), etc., and the 3D camera can be configured to use a specific one (or a specific set or type) processor(s) from the plurality of device 600 processors.

The depth sensing device 600 can be configured to run an operating system 670. Examples of operating systems include but are not limited to: Windows Mobile™ by Microsoft Corporation of Redmond, Wash., and the Android operating system developed by Google Inc. of Mountain View, Calif.

The 3D application 680 can be any application which uses 3D data. Examples of 3D applications include a virtual tape measure, 3D video, 3D snapshot, 3D modeling, etc. It would be appreciated that different 3D applications can have different requirements and features. A 3D application 680 may be assigned to or can be associated with a 3D application group. In some examples, the depth sensing device 600 can be capable of running a plurality of 3D applications 680 in parallel.

Imaging hardware 630 can include any imaging sensor, in a particular example, an imaging sensor that is capable of capturing visible light images can be used. According to examples of the presently disclosed subject matter, the imaging hardware 630 can include a sensor, typically a sensor that is sensitive at least to visible light, and possibly also a light source (such as one or more LEDs) for enabling image capture in low visible light conditions. According to examples of the presently disclosed subject matter, the device imaging hardware 630 or some components thereof can be calibrated to the depth sensor 20 and possibly also to the projector 10. It would be appreciated that such a calibration can enable texturing of the depth information (or 3D models generated according to the depth information) and various other co-processing operations as will be known to those versed in the art.

In yet another example, the imaging hardware 630 can include a RGB-IR sensor that is used for capturing visible light images and for capturing IR images. Still further by way of example, the RGB-IR sensor can serve as both the depth sensor(s) 20 and as the visible light camera. In this configuration, the driver 650 and the projector 10, and possibly other components of the depth sensing block 602, are configured to operate in cooperation with the imaging hardware 630, and in the example given above, with the RGB-IR sensor, to provide the 3D depth or range data, as well as with other components outside the depth sensing block 602.

The display unit 620 can be configured to provide images and graphical data, including a visual rendering of 3D data that was captured by the depth sensing block 602, possibly after being processed using the 3D application 680. The user interfaces 630 can include various components which enable the user to interact with the depth sensing device 600, such as speakers, buttons, microphones, etc. The display unit 620 can be a touch sensitive display which also serves as a user interface.

According to some examples of the presently disclosed subject matter, any processing unit, including the processor 115 of the depth sensing block 602, or the device processor 650 and/or any sub-components or CPU cores, etc. of any processor used in the depth sensing device 600, can be configured to read 3D images and/or frames of 3D video clips stored in storage unit 630, and/or to receive 3D images and/or frames of 3D video clips from an external source, for example through communication module 640; produce 3D models out of said 3D images and/or frames. By way of example, the produced 3D models can be stored in storage unit 630, and/or sent to an external destination through communication module 640. According to further examples of the presently disclosed subject matter, any such processing unit can be configured to process the captured image.

Figure 7:
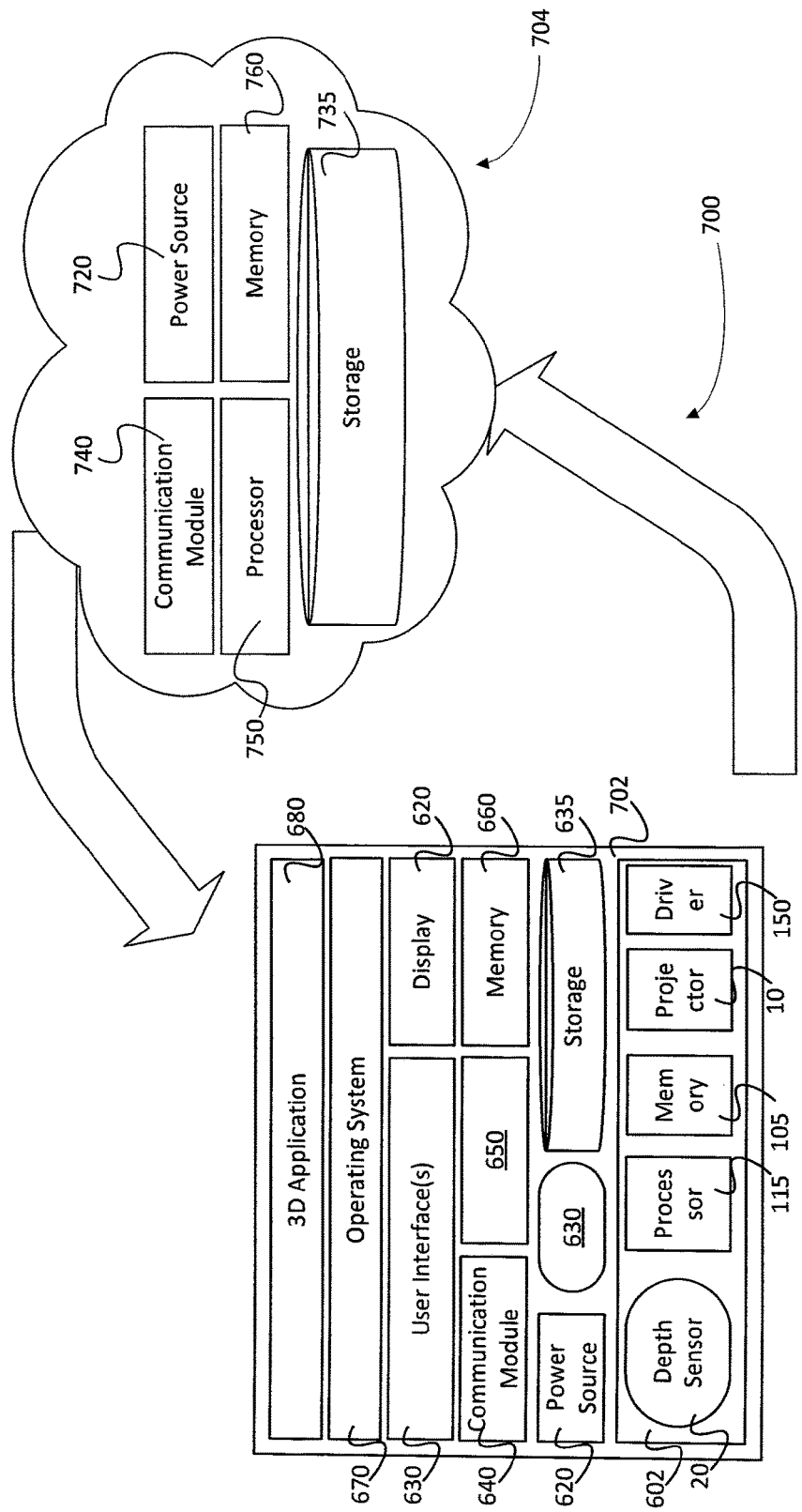
FIG. 7 is a simplified block diagram of an example of one possible implementation of a depth sensing device, that includes a mobile depth sensing device, and a cloud platform which includes resources that allow the processing of data provided by the mobile depth sensing device, possibly in combination with data from other sources, including from other depth sensing devices, according to examples of the presently disclosed subject matter.

FIG. 7 is a simplified block diagram of an example for one possible implementation of a depth sensing device 700, that includes a mobile depth sensing device 702, and a cloud platform 704 which includes resources that allow the processing of data provided by the mobile depth sensing device 702, possibly in combination with data from other sources, including from other depth sensing devices.

According to examples of the presently disclosed subject matter, the cloud platform 704 can include hardware components, including for example, one or more power sources 720, one or more storage units 735, one or more communication modules 740, one or more processors 750, one or more memory units 760, and so forth.

The storage unit 735 can be configured to store computer program code that is necessary for carrying out the operations or functions of the cloud platform 704 and any of its components. The storage unit 735 can also be configured to store one or more applications, including 3D applications, which can be executed on the cloud platform 704. In addition or as an alternative to application program code, the storage unit 735 can be configured to store data, including for example 3D data.

The communication module 740 can be configured to enable data communication to and from the cloud platform. By way of example, examples of communication protocols which can be supported by the communication module 740 include, but are not limited to cellular communication (3G, 4G, etc.), wired communication protocols (such as Local Area Networking (LAN)), and wireless communication protocols, such as Wi-Fi, wireless personal area networking (PAN) such as Bluetooth, etc.

The one or more processors 750 can include one or more processing modules which are capable of processing software programs. In this description, the device processor 750 may include different types of processors which are implemented in the cloud platform 704, such as general purpose processing units, graphic processing units, physics processing units, etc. The device processor 750 or any of the processors which are generally referred to herein can have one or more cores, internal memory or a cache unit.

According to examples of the presently disclosed subject matter, the one or more memory units 760 may include several memory units. Each unit may be accessible by all of the one or more processors 750, or only by a subset of the one or more processors 750.

According to some examples of the presently disclosed subject matter, any processing unit, including the one or more processors 750 and/or any sub-components or CPU cores, etc. of the one or more processors 750, can be configured to read depth information, 3D images and/or frames of 3D video clips stored in storage unit 735, and/or to receive 3D images and/or frames of 3D video clips from an external source, for example through communication module 740, where, by a way of example, the communication module may be communicating with the mobile depth sensing device 702, with another cloud platform, and so forth. By a way of example, the processing unit can be further configured to produce 3D models out of said, depth information or 3D images and/or frames. Further by a way of example, the produced 3D models can be stored in storage unit 735, and/or sent to an external destination through communication module 740. According to further examples of the presently disclosed subject matter, any such processing unit can be configured to process the captured image.

Figure 8:
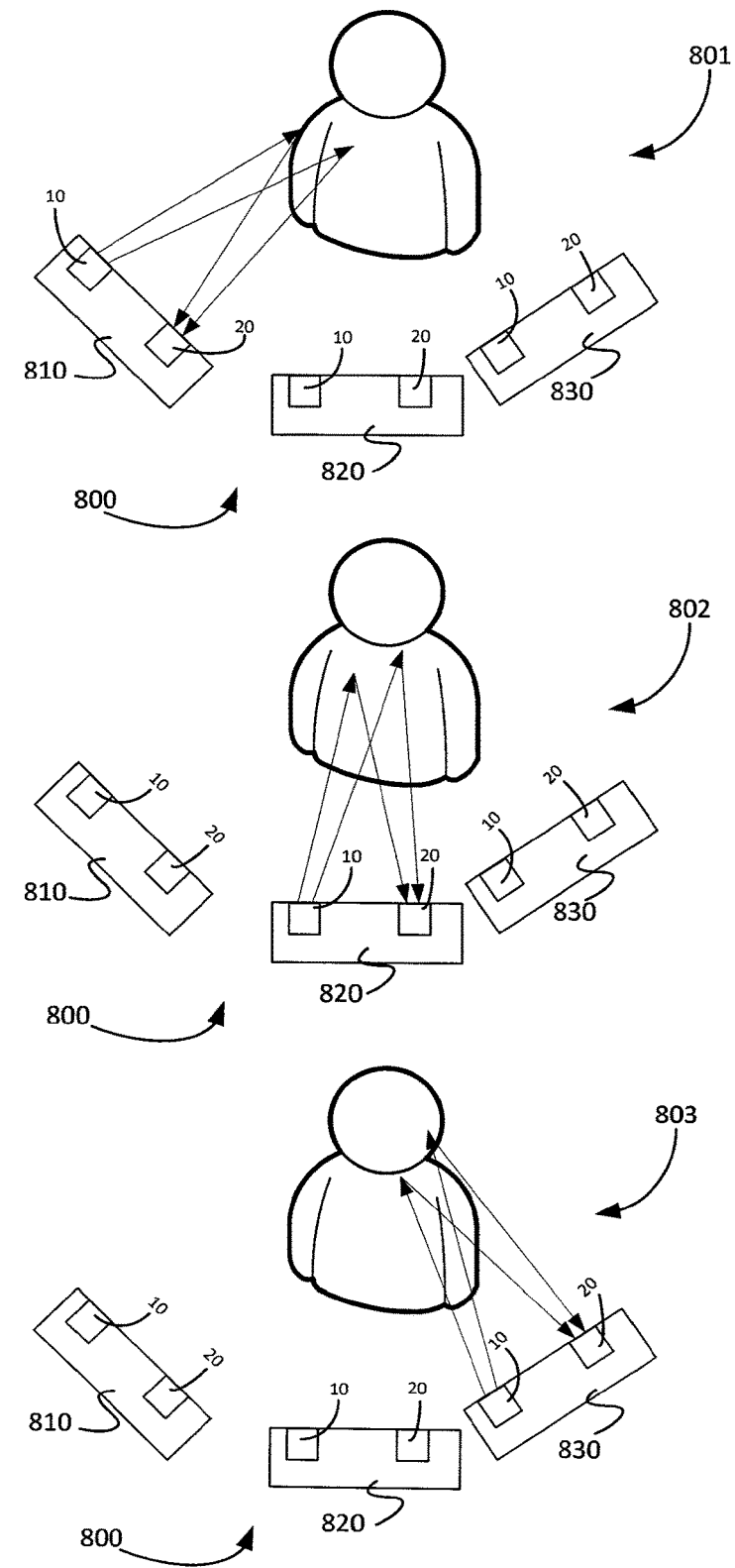
FIG. 8 is a graphical illustration of a plurality of depth sensing devices which have coordinated pulse timing, according to examples of the presently disclosed subject matter.

Reference is now made to FIG. 8, which is a graphical illustration of a plurality of depth sensing devices which have coordinated pulse timing according to examples of the presently disclosed subject matter. As is shown in FIG. 8, a plurality of depth sensing devices 810, 820 and 830 are disposed about a scene. For illustration purposes, the projector 10 and depth sensor 20 of each of the depth sensing devices 810, 820 and 830 is shown, however, the depth sensing devices 810, 820 and 830 can include other components as well and can have various configurations and designs, such as was described with reference to FIGS. 1-7 above.

According to examples of the presently disclosed subject matter, the depth sensing devices 810, 820 and 830 are part of a multi-device coordinated depth sensing group 800. A multi-device coordinated depth sensing group 800 can include two or more (e.g., three, four, . . . , n) depth sensing devices. The number of devices which can be part of a multi-device coordinated depth sensing group 800 is limited, inter-alia by pulse and/or exposure duration, frame rate and various other parameters (further described below).

The members of multi-device coordinated depth sensing group 800 are configured to operate in accordance with a coordinated pulse timing scheme. According to the coordinated pulse timing scheme each member of the group is allocated with an exclusive exposure duration, during which only that member of the group can emit a pulse and collect (via a depth sensor) the reflected portion of the light projected by the pulse. Further by way of example, frame timing is synchronized across all member of the multi-device coordinated depth sensing group 800 and each member of the group is allocated with a different portion of a frame. For convenience, the portion of a frame that is allocated to each member of multi-device coordinated depth sensing group 800 is referred to here as "exposure interval". Still further by way of example, between each allocated exposure interval, a certain buffer is kept. The buffer can be associated with various uncertainty parameters, as will be described in further detail below.

Thus for example, time instants 801-803 occur during a single frame (that is, a depth sensing frame). At time instant 801 device 810 is given an exclusive time window, device 801 is the only member of the group 800 whose projector is operated to emit a pulse and a signal is generated by its depth sensor based on a reflected portion of the light projected via the pulse. At time instant 802, the same exclusivity is granted to device 820, and at time instant 803 the exclusive time window is granted to device 830. The frame-wise pulse timing scheme illustrated in FIG. 8 can be repeated over multiple frames, so that the interruption-free and coordinated pulsing scheme is repeated at each frame.

Figure 9A:
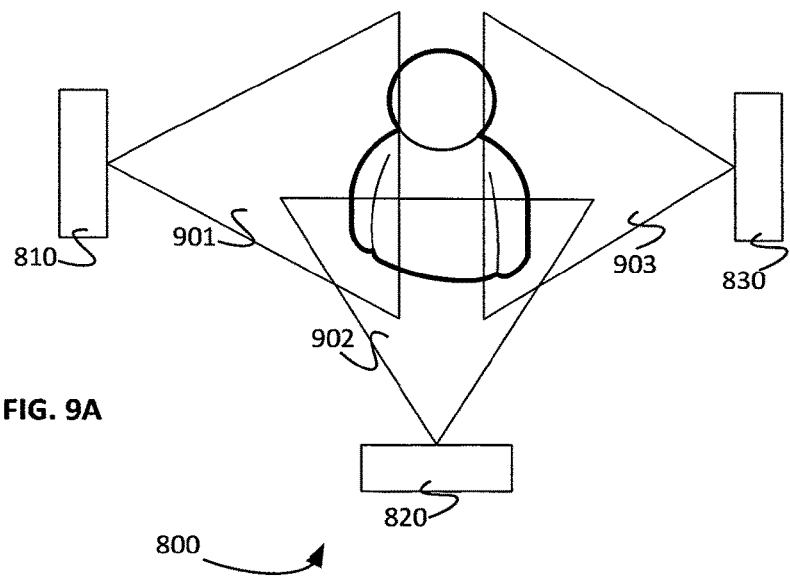
FIG. 9A shows the multi-device coordinated depth sensing group of FIG. 8 with each device's FOV, according to examples of the presently disclosed subject matter.

In FIG. 9A, the multi-device coordinated depth sensing group 800 of FIG. 8 is shown with each device's FOV, according to examples of the presently disclosed subject matter. As mentioned above, a multi-device coordinated depth sensing group 800 shares and implements a coordinated pulse timing scheme, such that in each frame each member of the group receives an exclusively allocated time-slot during which only it can fire a pulse and collect the reflected light. Having the members of the group positioned around the object such that each of the members 801-803 of the group 800 covers a different area of a scene or of an object (with some overlap to enable/aid in registration) the single frame multiple FOVs exposures capability made possible through the use of the coordinated pulse timing scheme supports wide coverage with substantially no motion blur in between exposures. In particular, when the goal is to obtain a broad coverage (wide angle) of a dynamic scene or object, the multiple exposures per-frame capabilities available for a multi-device coordinated depth sensing group can provide more accurate representation of the scanned object (or scene) and motion blur would be less noticeable compared to a single exposure per-frame scan done with a single depth sensing device moving around the object and capturing multiple frames over time to get the same coverage which the group of devices can achieve in a single or in a small number of frames.

It would be noted, that in order to achieve optimal coverage and facilitate co-registration of the depth information that is generated by the members of the multi-device coordinated depth sensing group 800, the members of the group need to be located in certain positions relative to the object of interest and relative to one another. Such optimal positions can rely on various factors including the FOV of each device, the registration algorithms that are used, the characteristics of the projected light, ambient conditions, the shape of the object of interest, etc.

In some examples of the presently disclosed subject matter, when the multi-device coordinated depth sensing group 800 is formed and/or at any point during an on-going coordinated depth sensing session, the positions of one or more members of the group 800 relative to the scene or relative to an object of interest within the scene can be determined. Still further by way of example, when the multi-device coordinated depth sensing group 800 is formed and/or at any point during an on-going coordinated depth sensing session, repositioning of one or more members of the group 800 relative to the scene or relative to an object of interest within the scene can be determined based on the above factors and taking into account a current position of the device. The current position of the device can be obtained using any known method, including based on sensors on board or associated with the device such as inertial measurement unit (IMU), global positioning system (GPS), based on a camera position determined by processing of the extracted depth information (e.g., the normals), based on the color images (stereo from motion analysis), etc. Repositioning instructions can be provided to one or more members of the group 800 accordingly. The positions of the devices 800 can be tracked on an on-going basis and positioning instructions can be issued from time-to-time as necessary. In another example, positioning instructions can be issued following each frame, or following a certain number of frames. The positioning instructions can relate to direction, distance, angle or orientation of the device.

Figure 9B:
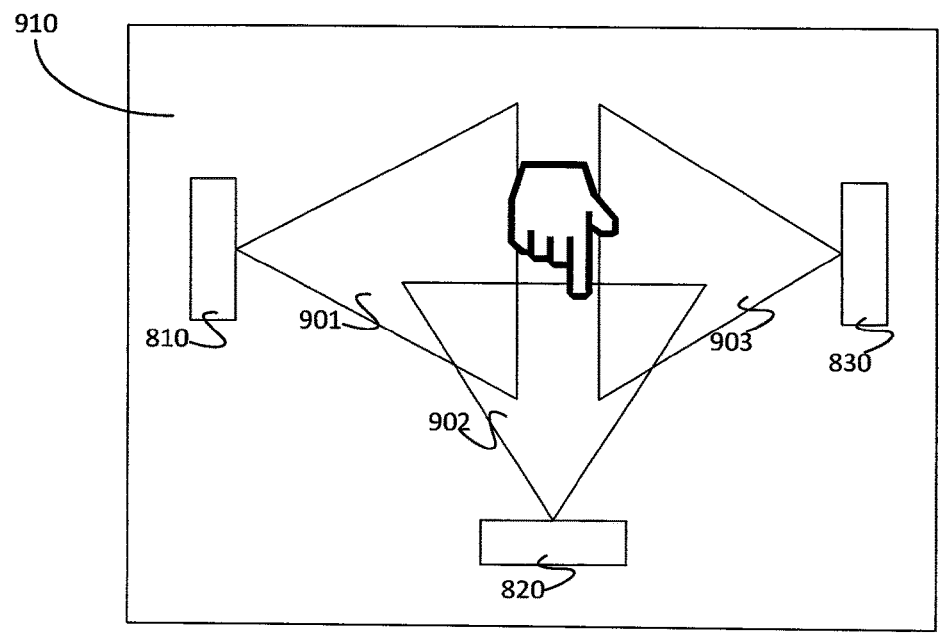
FIG. 9B shows the multi-device coordinated depth sensing group of FIG. 8 at fixed positions, according to examples of the presently disclosed subject matter.

Referring now FIG. 9B, the multi-device coordinated depth sensing group 800 of FIG. 8 is shown at fixed positions, according to examples of the presently disclosed subject matter. In FIG. 9B, the multiple devices 801-803 which form the multi-device coordinated depth sensing group 800 a fixed to a housing 910 and thus their relative position and the device's combined coverage is determined in advance. This configuration is suitable for certain applications, for example, when the object to be scanned is brought to the scanning rig, rather than the other way around. One example can be a gesture control module at a living room or in a public venue.

Figure 10:
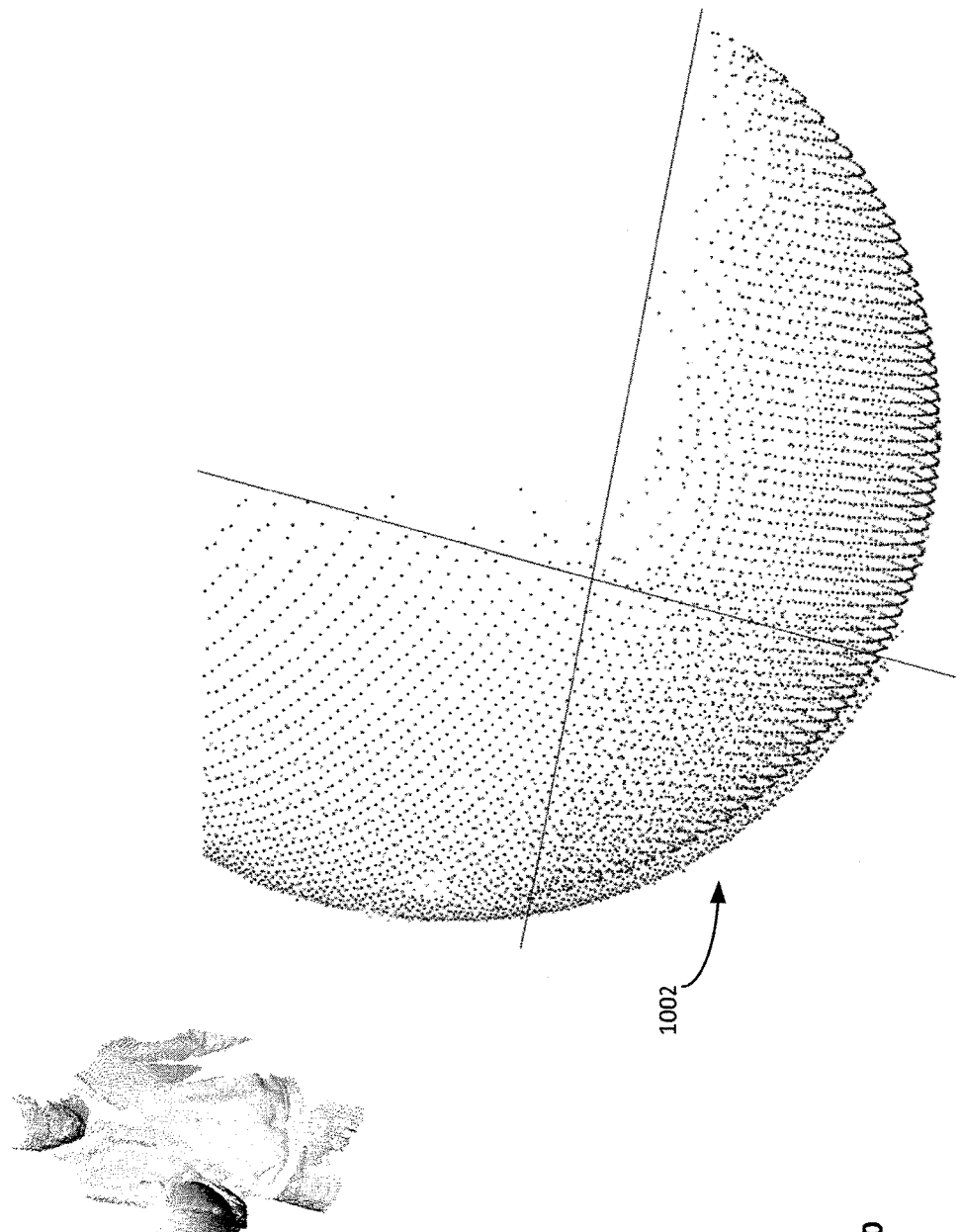
FIG. 10 shows a point cloud that was generated by combining the point clouds generated by each of two members of a multi-device coordinated depth sensing group during a single frame that were positioned about a person tossing a balloon, according to examples of the presently disclosed subject matter.

Reference is now made to FIG. 10 and to FIG. 11. FIG. 10 shows a point cloud that was generated by combining the point clouds generated by each of two members of a multi-device coordinated depth sensing group during a single frame that were position about a person tossing a balloon, according to examples of the presently disclosed subject matter. FIG. 11, shows a point cloud that was generated by combining the point clouds generated by a single depth sensing device over a plurality of frames, where the depth sensing device was used to scan a person tossing a beach ball, according to examples of the presently disclosed subject matter. In each of FIGS. 10 and 11 the full scene is shown from one perspective, for illustration. Focusing on an area of the balloon (FIG. 10) and the beach ball (FIG. 11), clearly shows the different level of motion blur in the combined point cloud. In FIG. 10, the area marked 1002 shows a substantially more subtle effect of motion blur compared to area 1102, for example, in FIG. 11.

As mentioned above, during each frame, each member 801-803 of the group 800 generates depth information, and by positioning the multiple depth sensing devices around an object of interest, the object can be scanned for depth from multiple directions in a single frame.

Figure 12:
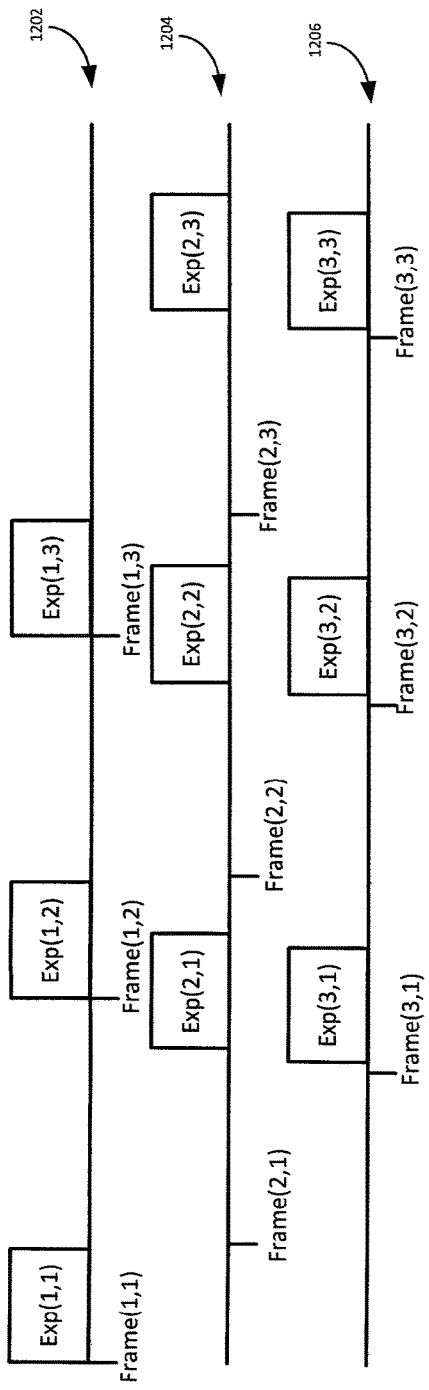
FIG. 12 shows charts of exposure timing on a plurality of depth sensing devices before a multi-device coordinated depth sensing group was created and before a coordinated pulse timing scheme was applied to the devices.

Reference is now made to FIG. 12, where there are shown charts of exposure timing on a plurality of depth sensing devices before a multi-device coordinated depth sensing group was created and before a coordinated pulse timing scheme was applied to the devices. Charts 1202, 1204, 1206 show frame and pulse timing during three consecutive frames on each one of depth sensing devices 801, 802 and 803, respectively. In FIG. 12 the exposure times are illustrated but it is appreciated by those versed in the art that exposure times and pulse emission times on a given depth sensing devices are substantially identical. As can be seen in FIG. 12, when the pulse timing is not coordinated across the plurality of devices 801-803, two or more device can emit pulses of light at the same time. When two (or more) coded light pulses are emitted at the same time, one may interfere with the other, and the code which is carried by the pulsed light emission can be corrupted. When the code is corrupted the captured signal cannot be used to extract depth information.

It should be noted that code corruption is a concern when the light emitted by a first depth sensing device is reflected onto the sensor of a second depth sensing device, and interferes with the signal which corresponds to the reflected portion of the light projected by the second device. This scenario is common when scanning or imaging an object by using multiple depth sensing devices arranged around the object. In order to avoid wholes in a 3D model (as one example of the intended use for the depth information) the projected light must cover the object of interest seamlessly and possibly with some overlap. When the pulse timing is not synchronized, the pulses from neighboring devices can interfere with one another.

Figure 13:
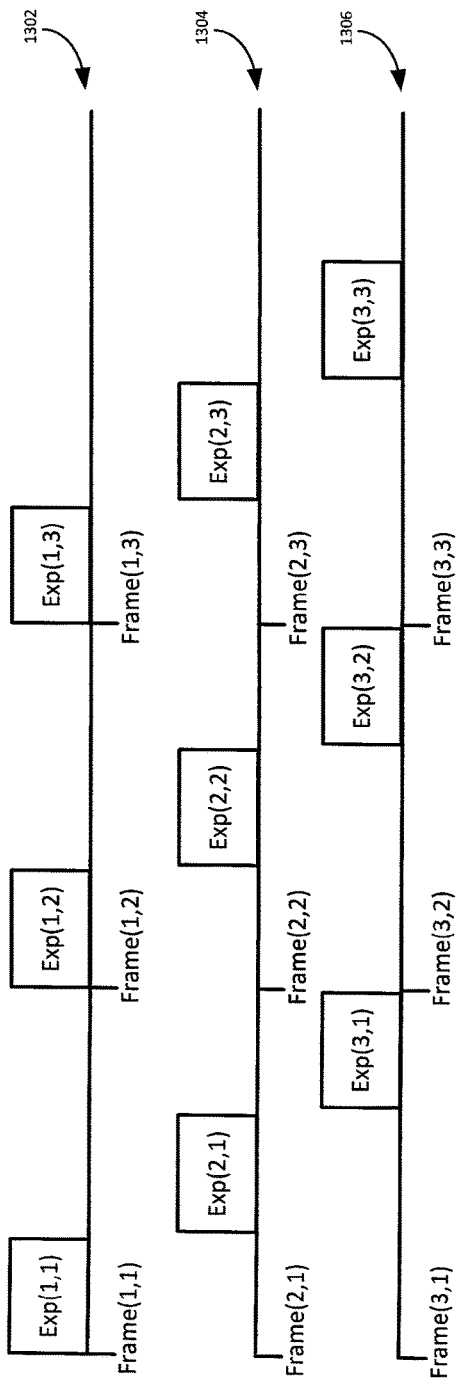
FIG. 13 there shows charts of exposure timing on a plurality of depth sensing devices which are part of a multi-device coordinated depth sensing group after a coordinated pulse timing scheme was applied to the devices, according to examples of the presently disclosed subject matter.

In FIG. 13 there are shown charts of exposure timing on a plurality of depth sensing devices which are part of a multi-device coordinated depth sensing group after a coordinated pulse timing scheme was applied to the devices, according to examples of the presently disclosed subject matter. Charts 1302, 1304 and 1306 shows frame and pulse timing during three consecutive frames on each one of a plurality of depth sensing devices 801, 802 and 803, respectively.

As can be seen in FIG. 13, after the timing of the pulses was coordinated across the plurality of depth sensing devices 801, 802, 803, at each frame, each of the devices is allocated with an exclusive time-slot during which only that member of a multi-device coordinated depth sensing group emits a pulse (and collects the reflected light via its sensor). The pulses can be timed such that they are substantially consecutive and there is no or only a (very) small gap between pulses within any given frame. In another example, the timing of the pulses within any given frame and the allocation of time slots to the members of a multi-device coordinated depth sensing group can be set in any other way with any desired interval between the time slots that are allocated to the various members of the group, so long as the duration of the pulses and the in-between pulses intervals does not exceed the duration of the frames (which is determined by the frame rate).

Figure 14:
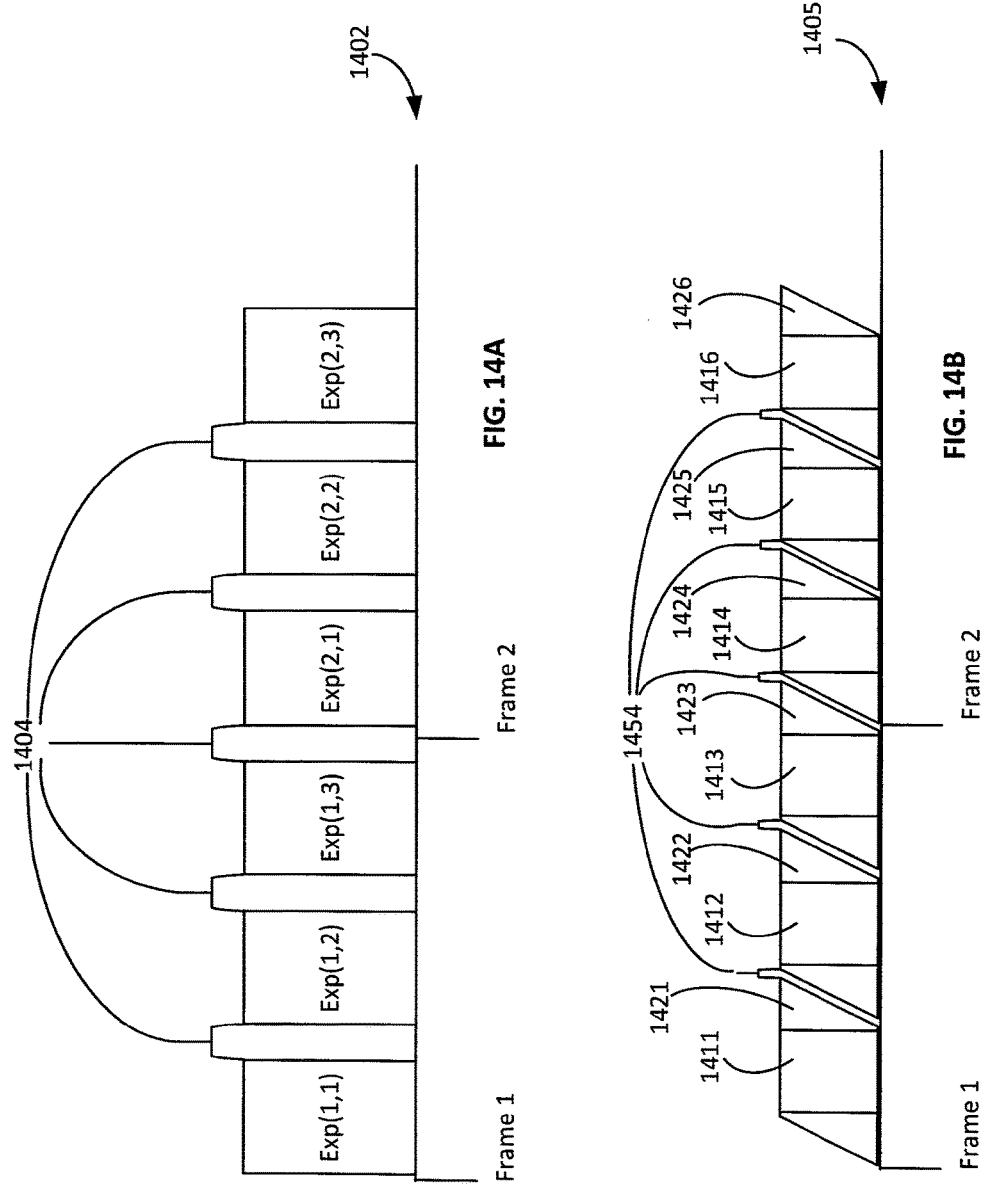
FIG. 14A shows the charts of exposure timing that were shown in FIG. 13 joined and placed on a common chart.
FIG. 14B shows an exposure timing scheme of a multi-device depth sensing group implementing a coordinated pulse timing scheme, where the devices use rolling shutter sensors, in accordance with examples of the presently disclosed subject matter.

Reference is now additionally made to FIG. 14A, where the charts of exposure timing shown in FIG. 13 were joined and placed on a common chart. In FIG. 14A the exposure timing chart 1402 shown the division of the each frame and the allocation of the frame to pulse timeslots that include exposure times, allocated to each member of the multi-device coordinated depth sensing group (exp(1,1), exp(1,2), . . . , exp(2,3), and the in-between exposure intervals 1404.

In FIGS. 13 and 14A, the devices that were joined in a multi-device depth sensing group implementing a coordinated pulse timing scheme, were devices which rely on a global shutter. Referring now to FIG. 14B, there is shown an exposure timing scheme of a multi-device depth sensing group implementing a coordinated pulse timing scheme, where the devices use rolling shutter sensors, in accordance with examples of the presently disclosed subject matter. The rolling shutter devices fire their pulses during a portion of the exposure duration. In the examples of FIG. 14B, the rolling shutter devices fire the pulses when all the sensor lines are exposed, and the duration of the pulse is equal to the period when all the lines of the sensor are exposed. It would be noted, that other configurations and relationship between the pulse timing and the rolling shutter exposure can exist. This relationship is depicted in FIG. 14B by the relationship between each exposure 1411, 1412, 1413, 1414, 1415 and 1416 and respective pulse 1421, 1422, 1423, 1424, 1425 and 1426. In order to avoid exposure of the sensor of one device to the reflected portion of the light projected by the projector of another device, the exposures of the devices participating in the multi-device depth sensing group need to be coordinated, so that an exposure on one device, say exposure 1422 begins only after the pulse from any of the devices, say 1411, ends. When the duration of the pulse, say 1411, is equal to the period during which the sensor is fully exposed (see for example exposure 1421), the exposure 1422 by the subsequent device can starts while exposure 1421 is still ongoing, but the pulse by the subsequent device 1412 will only start after exposure 1421 ends. It would be noted that the uncertainty interval 1454 can also be introduced in between exposures, however in some implementations it may not be necessary to have an interval in between exposures for rolling shutter devices.

In FIGS. 13 and 14A and 14B, the coordinated pulse timing scheme involve synchronization of frame timing across the members of the multi-device coordinated depth sensing group, and an equal frame rate and frame duration on each of the devices. It would be appreciated that other coordination schemes may be devised including for devices which do not have an equal frame rate or in which the frame start and end times are not identical across the devices in a multi-device coordinated depth sensing group.

The interval in-between pulses can be associated with uncertainty parameters. Still further by way of example, the uncertainty parameters are associated with any factor that may have an effect over the accuracy of a process of coordinating pulse (or exposure) timing across two or more depth sensing devices.

In further examples, the in-between pulses interval can be substantially equal to the aggregate of the uncertainty parameters. In still further examples, the interval in-between pulses can be larger by some predefined margin from the aggregate of the uncertainty parameters. By way of example, the uncertainty parameters can include: coordination protocols variability parameters, clock and/or time stamp precision, exposure offset precision, drift estimation, etc. The uncertainty parameters are described in more detail below.

It would be appreciated that physical proximity may be a requirement (either a functional or an operational requirement) for pairing devices 801, 802 and 803 to form a multi-device coordinated depth sensing group and for establishing the coordinated pulse timing scheme across the members of the group.

Figure 15:
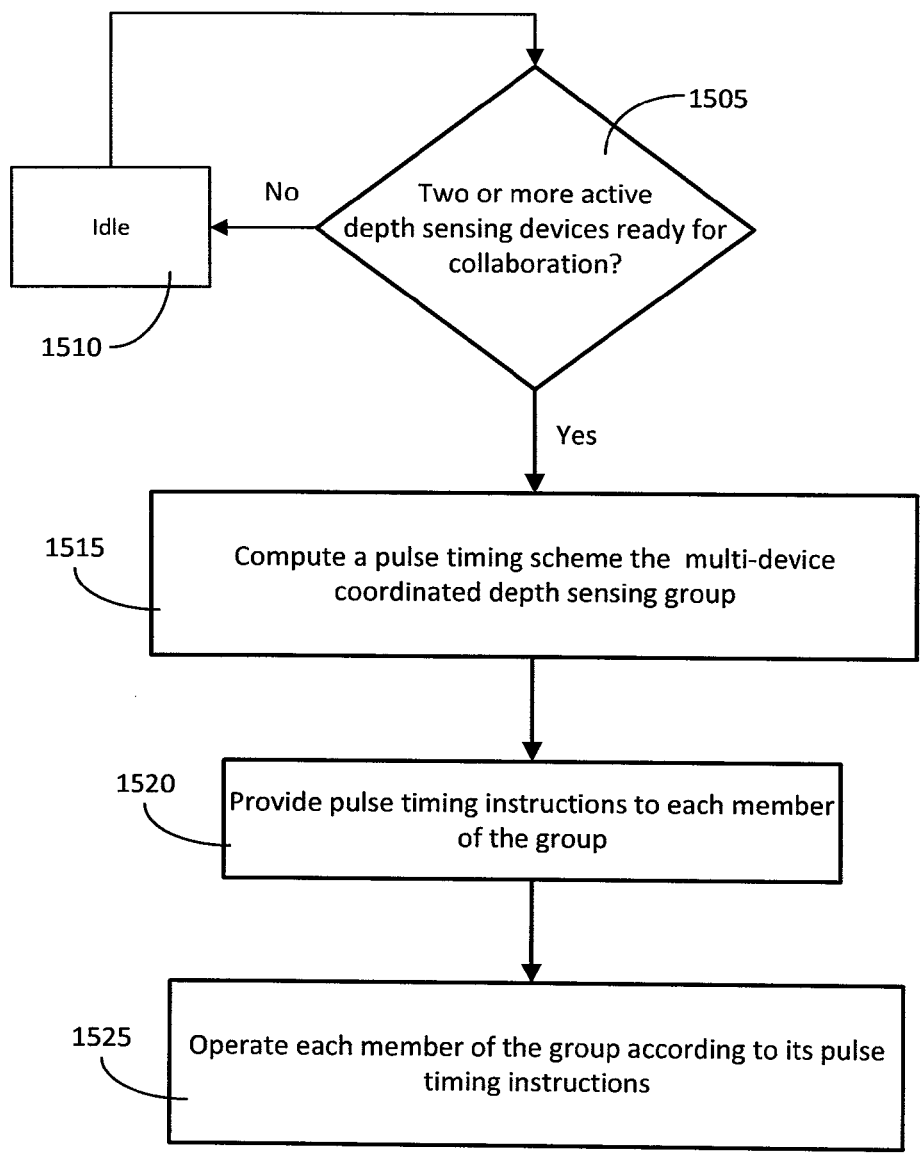
FIG. 15 is a flowchart illustration of a method of coordinating pulse timing across a plurality of devices to form a multi-device coordinated depth sensing group, according to examples of the presently disclosed subject matter.

Reference is now made to FIG. 15, which is a flowchart illustration of a method of coordinating pulse timing across a plurality of devices to form a multi-device coordinated depth sensing group, according to examples of the presently disclosed subject matter. The method begins when two (or more) active depth sensing devices are ready for coordination (block 1505). In one example, two depth sensing devices are ready for coordination when the devices, or the operators of the devices, are capable and willing to engage in a coordinated depth sensing session. It should be noted that a single operator can use two (or more) devices, and the operator can coordinate the devices to form the multi-device coordinated depth sensing group.

According to examples of the presently disclosed subject matter, there may be pre-requisite requirements for establishing a coordinated depth sensing session. Some of the requirements may relate to physical and environmental conditions or circumstances.

For example, the two or more depth sensing devices that are to participate in the session may need to be within some distance from one another. This requirement may be associated, for example, with the type of communication that is used for setting up and/or for running the session on the devices. Some wireless communication protocols such as near field communication (NFC) and Bluetooth use short range transceivers and any session which relies on such communication has a limited range.

Another factor which can limit the acceptable distance between devices that can participate in the session is the effective depth sensing range of a device participating in the session. Typically this limitation would be set according to the device whose range is the shortest in the group. Other requirements may relate to the hardware and/or the software that is used in the devices.

In some cases, for example, the hardware and/or the software and/or the configurations or definitions used in a first depth sensing device may not be compatible or does not support joining in a coordinated depth sensing session with the hardware and/or the software and/or the configurations or definitions used in a second depth sensing device. In yet other cases, due to some temporary limitation or constraint, a certain depth sensing device cannot join a coordinated depth sensing session (either with a specific second device, or with any device). For example, when the available power resources on the device are below a certain threshold, the device cannot activate it depth sensing capabilities and the components involved in the depth sensing function. Another example of a limitation may be a privacy or data sharing setting on the device.

In addition to the requirement that there are at least two depth sensing devices which are capable of engaging in a coordinated depth sensing session in accordance with examples of the presently disclosed subject matter, it is necessary that there are least two such devices which are willing (or the user operating the devices has agreed to) engage in such a session. The permission can relate to any operation and configuration that is required by or otherwise associated with setting up the session and running or managing it, or can relate to the session as whole, including any configuration and operation that is required to enable and run the session (or the part of the section which is configured and run) on the device. Any one of the devices can have default settings which allow or prevent pairing with another devices in general or for the specific purpose of the coordination or the purpose for which the coordination is required, such as collaborative depth sensing in one example. Any of the devices can, prior to initiating and engaging in a collaborative depth sensing session, request a user to authorize (or decline) any activity associated with the initiation or engagement in sessions, including for example, sharing a location of the device, granting control over and/or access to various resources, configurations, functions, information or components of the device to another device or to some other external entity that is involved in setting up or managing the session.

Examples of user control and user interface features which may allow a user to interact with a depth sensing device and enable and/or control the setting up and implementation of a collaborative depth sensing session are described below.

If (for any reason) there are no two (or more) active depth sensing devices that are ready for collaboration, the depth session initiation process becomes idle (block 1510). The process can remain idle for a certain period of time, until a predefined event triggers it, or when an instruction is received to initiate the process once more (for example, from a user operating depth sensing device which implements the depth session initiation process).

However, if two or more depth sensing devices are ready for coordination, a coordinated pulse timing scheme can be computed for the now forming coordinated depth sensing group (block 1515). In order to compute the coordinated pulse timing scheme certain data may be required and the computation of the coordinated pulse time is preceded by a pairing operation and establishing a communication channel over which the data that is necessary for computing the coordinated pulse timing scheme. It would be appreciated that additional data can be exchanged, including data that is required or is useful for other features which are available in a multi-device coordinated depth sensing group. In other cases the pulse timing scheme is determined by running a setup routine during which the timing of the pulses is determined by activating the depth sensing devices and analyzing the signals generated in response to pulses emitted by the devices. More specifically, the devices can be activated and the signals collected by the devices can be processed to determine if and when one device interferes with another, and specifically when the pulse from one device interferes with the pulse from another device. When an interference occurs the pulse timing on one or more of the devices is modified and the process is repeated as necessary until a desired pulse timing scheme for each member of the group is achieved. The various setup and coordination options are discussed in more detail below.

The data that is required for computing the coordinated pulse timing scheme can be obtained from the members of the group or it can be based on preset or default data. In other cases, certain settings and configurations that are required for the coordinated pulse timing scheme may be provided as instructions by the entity which generates the coordinated timing scheme. The members of the multi-device coordinated depth sensing group can be configured to implement and work in accordance with the received instructions. Some of the setting and configurations may be based on past sessions with the current members or with other devices which are not members of the currently forming group (possibly members that share the same or similar characteristics, setting or configurations as the current members).

Once the coordinate pulse timing scheme is ready, the scheme can be provided to each member of the multi-device coordinated depth sensing group (block 1520), and each member of the group can implement the scheme and operate in accordance with the scheme to provide a coordinated depth sensing session in collaboration with the other members of the group (block 1525). The coordinated pulse timing scheme can be provided to the devices in the group as an instruction or a set of instructions. The instructions can include instructions for timing of a pulse. The instructions can also include instructions for synchronizing a clock signal of a clock generator, instructions for setting exposure timing, instructions for setting a frame timing, instructions for setting a duration of a pulse, exposure and/or frame, instructions for setting exposure and/or frame timing in an imaging sensor, instructions for setting other configurations of the imaging sensor, instructions for positioning the device, etc.

According to one implementation of the pulse timing coordination method, a master slave configuration can be used to setup the multi-device coordinated pulse timing scheme and control it, as well as for establishing the multi-device coordinated depth sensing group and controlling it, according to examples of the presently disclosed subject matter. One example of a master-slave implementation of the method of coordinating pulse timing is described in FIG. 16. However, it would be appreciated that other possible implementations can be used to coordinate pulse timing across a plurality of depth sensing devices. In one example, a coordination server or any other central coordination entity can be used (assuming that the communication latency and lag is small enough to achieve sufficiently accurate timing). In another example, the coordination and synchronization method can be based on peer-to-peer communications.

Figure 16:
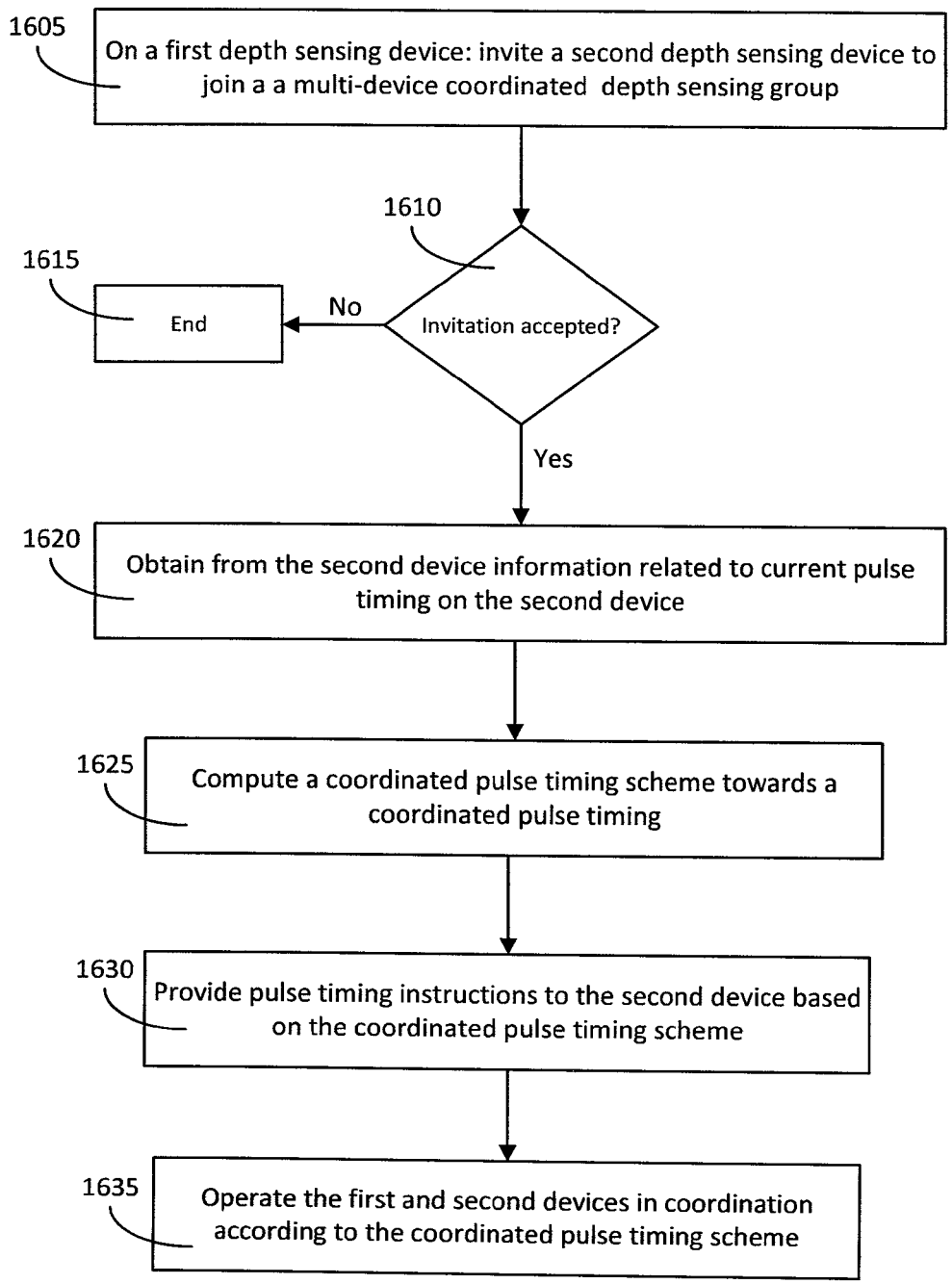
FIG. 16 is a flow chart illustration of a method of coordinating pulse timing in a depth sensing device, according to one possible implementation of a setup and control model that is based on a master slave relationship, in accordance with examples of the presently disclosed subject matter.

Reference is now made to FIG. 16, which is a flow chart illustration of a method of coordinating pulse timing in a depth sensing device, according to one possible implementation of a setup and control model that is based on a master slave relationship, in accordance with examples of the presently disclosed subject matter.

Initially, a first depth sensing device can invite a second depth sensing device to join a multi-device coordinated depth sensing group (block 1605). According to examples of the presently disclosed subject matter, the first device can include a computer program and hardware components which can be used to establish a connection with the second device. For example, on the first device a short range wireless communication module can be used to communicate a connection request over a wireless channel. The request can be addressed to a specific device, to a specific group of devices (according to specific addresses, or according to some feature or property of the device, etc.) or the request can be intended for any device within range of the communication (possibly with a limit on the number of devices which can join the multi-device coordinated depth sensing group).

For example, the first device can operate in a discovery mode and can search within a certain communication range for other devices which support coordinated depth sensing or collaborative depth sensing. In one example, only devices which are setup to allow discovery can be discovered by the first device. The first device can initiate a discovery routine, and if the second device permits discovery and is within range, the first device will discover the second device and will initiate a handshake or any other pairing routine.

In other examples, the first device can send an invitation to any desired device, to devices within a certain area (e.g., a communication range) to devices within a certain list (e.g., a social network friends list), etc. The second device can respond to the invitation by accepting it or rejecting it. The response can be generated automatically according to predefined settings, or the response can be generated based on an input (or lack thereof) from an operator of the second device.

If the invitation to participate in a coordinated pulse timing group (block 1610) is not accepted, the process (at least vis-à-vis the second device) terminates (block 1615). In case the invitation is accepted, the second device sends an acknowledgement message back to the first device, and possibly explicitly indicates that the invitation is accepted. Upon receiving the position response the first device can execute the coordinated pulse timing scheme setup routine. As part of the setup routine, the first device can obtain from the second device information related to the pulse timing on the second device (block 1620).

It would be noted that various communications can be exchanged between the devices in order to establish the communication channel, and to maintain it, as well as for providing the information that is necessary for determining the coordinated pulse timing routine, initiating it, and controlling it. Such communications can be initiated and controlled by dedicated computer software program, such as an application running one or both of the devices (in case of two communicating devices). The communications can also be initiated and controlled by the operating system running on the devices. In any case, an operator of one or both devices can be involved in the setup and/or implementation of the coordinated pulse timing routine and can make selections and set various parameters and thus control at least certain aspects of the setup and/or implementation of the coordinated pulse timing routine. Further by way of example, the setup routine may involve entering a password or a key or using some other verification or authorization to enable the connection or pairing of the devices. Following authentication and approval (if required) the channel is established, and the devices can exchange the information that is necessary to setup, run and control a coordinate depth sensing session. The communications between the members of a multi-device coordinated depth sensing group can be encrypted and can be accessible only by the addressee. In another example, the communications within the group can be accessed by any member of the group but not by entities outside the group. In still a further example, access by an entity outside the group requires explicit authorization by a member of the group, and in another example, such access can only be granted by the member of the group which serves as master. Adding a new member to the group may require rebuilding of the group and recalculating the coordinated pulse timing scheme. In another configuration, the coordinated pulse timing scheme can support a predefined number of devices, and such devices can dynamically join (and leave) a multi-device coordinated depth sensing group and receive (or return) an allocated and coordinated time-slot for its exposures, as long as the number of devices in the group does not exceed the maximum number of devices that is supported by the coordinated pulse timing scheme.

The master slave model implementation in FIG. 16 uses data exchanges to gather the information that is necessary for establishing the coordinated pulse timing scheme. However, as was mentioned above, and as will be described in further detail below, in other implementations some or all of the data that is needed for determining the coordinated pulse timing scheme can also be obtained by implementing a setup routine which involves activating the depth sensing devices and analyzing the signals generated in response to pulses emitted by the devices to establish an appropriate coordinated pulse timing scheme.

The first device obtains its own pulse timing information and computes a coordinated timing scheme, to allow the first and the second devices to have coordinated pulse and exposure timing. The timing scheme can indicate some reference timing and the time-slot that is allocated to each one of the devices which participate in the coordinated pulse timing scheme.

The timing scheme can also involve synchronizing frame timing. The coordinated pulse timing scheme may allocate to each device a coordinated sub-frame time-slot (block 1625). In one example, the sub-frame time-slot can be indicated by a certain offset from a frame start time. The duration of the allocated time-slot can be predefined or can also be indicated by the timing scheme that is communicated to the member of the group. In some examples, the coordinated pulse timing scheme is provided for a model frame and is repeated at each frame until the session is terminated or until the current scheme is replaced by an updated coordinated pulse timing scheme.

Pulse timing instructions which are based on the coordinated pulse timing scheme are provided to the second device (block 1630) and the first and second devices are operated in coordination according to the coordinated pulse timing scheme (block 1635). Blocks 1625, and possibly also block 1620 (as necessary) can be repeated from time to time, either to change the allocation of sub-frame time slots, to compensate for drifts and/or to allow additional devices to join the multi-device coordinated depth sensing group. The update can be initiated by the first device, however, any device in the group, and any device which is requesting to join the group can trigger the update by communicating with the first device.

In FIG. 16, a scenario where two devices are joined to form a multi-device coordinated depth sensing group. However it should be noted that the number of devices in a multi-device coordinated depth sensing group is not limited to two, and in the case where there are more than two members joining to form a group, one of the devices can serve as a master and the other devices can be as slaves.

The master/slave designation can be done in any possible way. For example, the master can be the device initiating the connection between with the first slave (and then more slaves can be added). In another example, the selection of the master devices is made in accordance with the characteristics or configuration of the devices. For example, the device which has the most processing power or the highest battery levels is selected as master. In yet another example, an operator of one of the devices selects which of the devices (including itself) will serve as the master. In yet another example, the master is selected according to the position of the devices around a scene or around an object of interest. In one example, when the object of interest is a person's face, facial recognition can be used to establish which device covers a largest part of a front of the face (or any other part of features of the face) and that device is selected as master. In another example, the device which has the shortest average distance to the other devices in the group is selected as master.

There are various known pairing and channel setup procedures, and any suitable procedures can be used. For example, the devices in the group can be paired and connected over a wireless connection, such as Wi-Fi, Bluetooth or NFC. In other cases a wired connection, such as Ethernet is used as the communication channel over which the devices are connected. A dedicated computer software which preforms discovery, handshake and channel setup between two or more depth sensing device can also be used.

In some cases a user on the master and/the slave device may receive a notification that another device is seeking to establish a multi-device coordinated depth sensing group, and to establish a coordinated depth sensing session with the user's device. The user can respond to the communication with an acceptance message or refuse it (or ignore the message). It may be necessary to exchange codes to authorize and authenticate the connection.

The coordination process can be part of the pairing and channel setup or can be implemented as a separate operation following the pairing and channel setup. The coordination process can be based on synchronization protocols and algorithms. In one example, reference broadcast synchronization can be used in the coordination process. A protocol such as IEEE 1488 (also referred to as network time protocol or NTP) or IEEE 1588 (precision time protocol or PTP) can be used.

Figure 17:
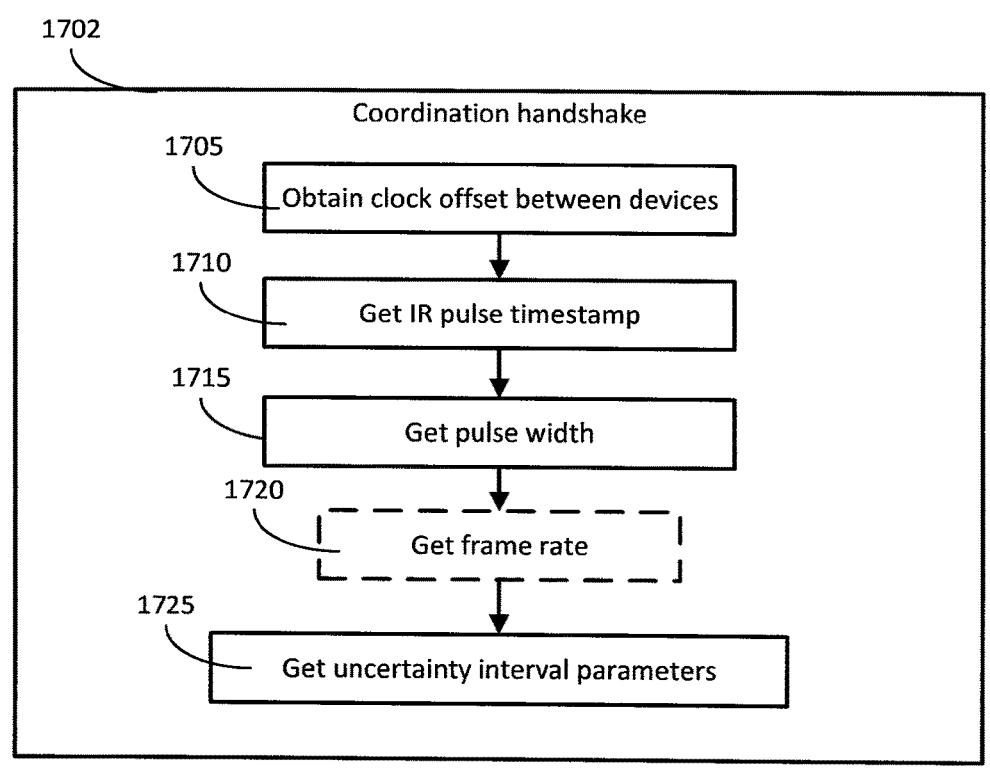
FIG. 17 shows an example of basic operations which may be required for and implemented as part of establishing a coordinated pulse timing scheme, in accordance with examples of the presently disclosed subject matter.

Reference is now made to FIG. 17, which provides an example of basic operations which may be required for and implemented as part of establishing a coordinated pulse timing scheme, in accordance with examples of the presently disclosed subject matter. According to examples of the presently disclosed subject matter, as part of establishing a coordinated pulse timing scheme (block 1702). The process 1702 is described with reference to a single device, but can be implemented on each member of a multi-device coordinated pulse timing group. In case the master slave model is used for setting up the coordinate pulse timing scheme, the master can obtain (or the slaves can provide) the necessary information from each one of the salves, and within the master the information is gathered from the master's internal resources and components. It should be appreciated that the information which is collected in FIG. 17 is one example of the type of information which can be obtained for and used in the calculation of a coordinated pulse timing scheme, and that other types of information can be obtained, in addition or as an alternative to the information collected in the example in FIG. 17, depending on implementation, the internal configuration of the devices in the group, coordination of additional aspects of the operation of devices in the group, etc.

As part of the establishing a coordinated pulse timing a clock offset between devices can be obtained (block 1705). The pulse timing is based on a certain clock signal that is generated by a clock generator in each device. There may be an offset between different clock generators, and so as part of the coordination handshake the clock offset between devices is determined. In case a master slave model is used for establishing the coordinated pulse timing, the clock offset between the master and each of the slave devices is determined.

The IR pulse timestamp is also obtained (block 1710). The IP pulse timestamp indicates when pulses are fired. The IR pulse timestamp can be provided in various forms. For example, the IR pulse timing can be provided relative to the timing of a frame (as a certain offset from the start of a frame), in which case the frame rate or frame timing may also be obtained (block 1720).

The pulse width may also be required (block 1715). In many active depth sensing devices, the pulse duration can be modified. Modifying the pulse width can be used to control to the amount of energy that is projected onto. In some cases, modifying the pulse width can be used to prevent overexposure and/or underexposure to achieve a desirable level of contrast. The coordinated pulses timing scheme should take into account the pulse width that is used in each device. The coordinated pulse timing scheme can specify the pulse width that is to be used by each device, and such pulse width can be identical to the pulse width which the device was using previous to the implementation of the scheme, or it can be different than the pulse width which the device used previous to the implementation of the scheme.

The frame rate in each device can also be obtained (block 1720). As mentioned above, in some cases getting the frame rate is required in order to establish a coordinated timing scheme, for example, when the pulse timing is given in the form as an offset from a frame start point. In other cases, the frame timing and frame rate is optional since coordinated pulse timing across the members of the multi-device coordinated pulse timing group can be achieved by adjusting the pulse timing directly. In an example of an implementation of a coordinated pulse timing scheme when the frame and frame timing is used, the timing and duration of frames can be synchronized across all members of multi-device coordinated pulse timing group, and the pulse timing can be coordinated by providing coordinated pulse offset times for each member of the coordinated pulse timing group.

In addition to the timing properties mentioned above, as part of establishing a coordinated pulse timing scheme, various uncertainty interval parameters can be obtained (block 1725). The uncertainty parameters can be associated with inaccuracy of synchronization and coordination mechanisms that were used to establish the coordinated pulse timing scheme and to implement it. The uncertainty parameters can represent expected (an evaluation of) real-life variance of timing across members. For example, the uncertainty parameters can include: timestamp precision, exposure offset precision and drift estimation as well as a measure of the variability of the synchronization or coordination protocol that is used and of the physical interfaces and communication channel involved in the process. For example, if the PTP protocol is used, in addition to the timestamp precision, exposure offset precision and drift estimation, a parameter which represents PTP variability can be used.

In the above examples, the focus of the description was on an implementation of a coordinated pulse timing scheme setup routine where sharing of clock and pulse timing (and additional related information) were the basis for establishing the pulse timing in each member of the multi-device coordinated depth sensing group. Now there is described a further example of a coordinated pulse timing scheme setup routine which is based on activating the devices which are to be operated as a multi-device coordinated depth sensing group (possibly one pair at a time), processing the images (or samples) of the reflected portion of the projected light, and modifying the frame rate of at least one device until a desired offset is achieved between the pulse timing of the devices. This details of this implementation are provided now.

Figure 18:
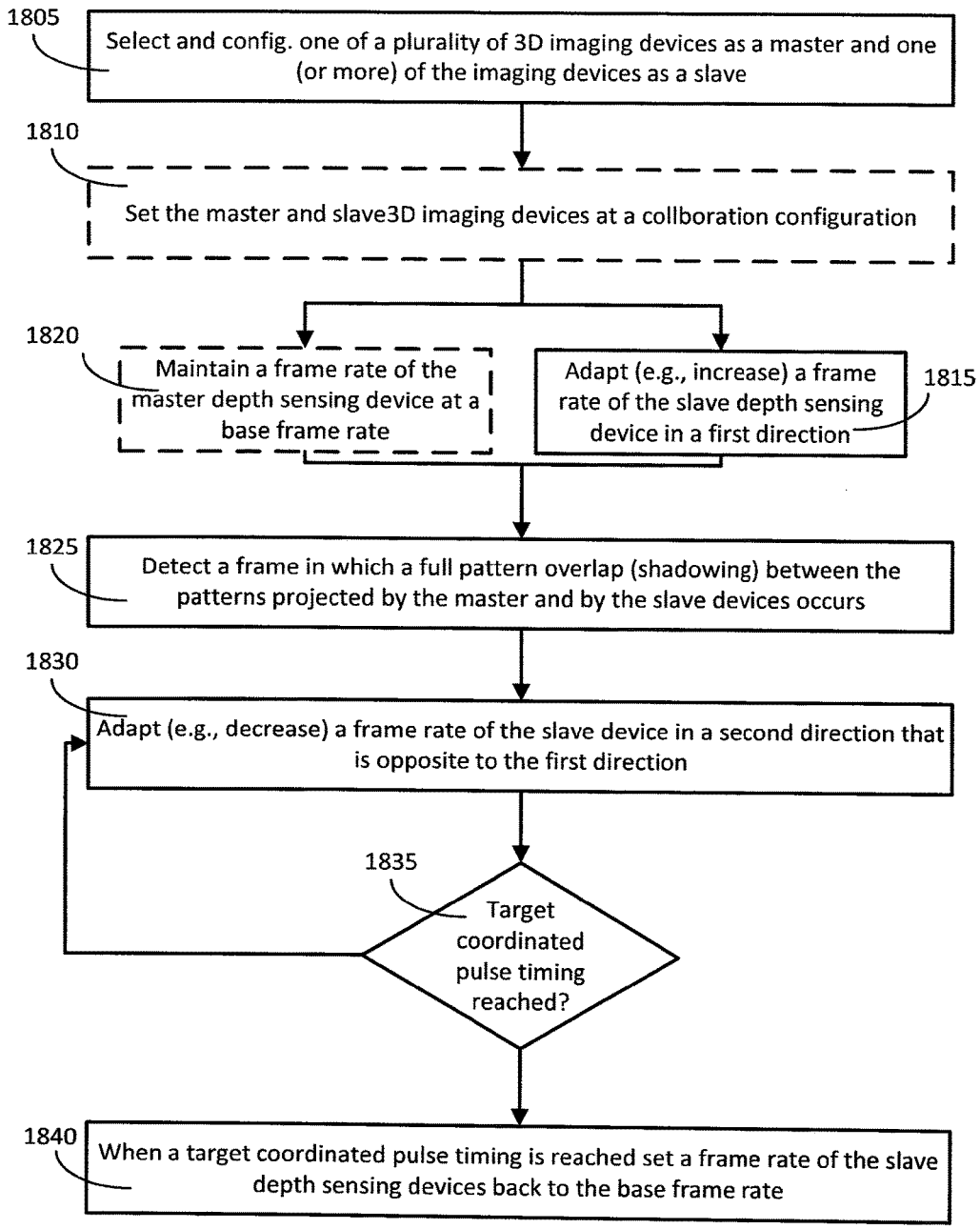
FIG. 18 is a flowchart illustration of a method of synchronizing a plurality of 3D imaging devices, according to examples of the presently disclosed subject matter.

Reference is now made to FIG. 18, which is a flowchart illustration of a method of synchronizing a plurality of 3D imaging devices, according to examples of the presently disclosed subject matter. By way of example, the method illustrated in FIG. 18 and described herein with reference to FIG. 18 can be implemented by a plurality (two or more) of devices such as device 100 illustrated in any one of FIGS. 1-5 or devices 600 and 700 illustrated in FIGS. 6 and 7, respectively. However, it would be appreciated that the method illustrated in FIG. 18 and described herein with reference to FIG. 18 can be implemented by any suitable computerized device.

In FIG. 18, and in the description of FIG. 18 provided below, it is assumed that the master and slave devices each fire their pulse at a given time (or at a fixed offset) from the start of a frame. The method shifts the duration of a frame in one direction on one device, and causes the pulse timing of that depth sensing device (e.g., the slave) to move relative to the timing of the other depth sensing device (e.g., the master). When the timing of the pulses fired by both devices fully coincides, a difference between the frame rates on the two devices is maintained for a certain number of frames until a certain pulse timing offset is obtained at which point the frame rate of the first device is modified back to the original frame rate, and the timing of the pulses is thus coordinated when the two devices are operated at the same frame rate. This process can be repeated when coordination is lost or deteriorates (for example, due to drift) or as a matter of routine. It would be appreciated that a similar master slave implementation can be used to synchronize frame timing (the timing when each frame begins) and assuming a common frame rate (and duration), the pulse timing on each depth sensing device can be coordinated by setting the exposure timing (and the timing when the pulse is fired) on each device as an offset from the start of a frame.

According to examples of the presently disclosed subject matter, when forming or re-configuring a multi-device depth sensing group, one of the plurality of depth sensing devices can be selected and configured to operate as a master depth sensing device at least during a coordinated pulse timing scheme setup routine. At least one other depth sensing device can be selected and configured to operate as a slave depth sensing device (block 1805). For convenience the description makes reference to a single slave depth sensing device, however those versed in the art can readily extrapolate the description provided herein to a scenario in which more than two depth sensing devices are provided and the herein described pulse coordination process needs to be adapted to allow for the coordination of a greater number of depth sensing devices.

Optionally, the method according to examples of the presently disclosed subject matter, can include setting the master and the slave depth sensing devices at a coordination setup mode (block 1810). By way of example, the coordination setup mode can include positioning the master and the slave depth sensing devices at a constant relative position with respect to one another during the implementation of the coordination setup. The coordination setup mode can also include fixing or using a fixed scene object.

According to examples of the presently disclosed subject matter, as part of the coordination setup, the frame rate of the salve depth sensing device can be adapted or modified in a first direction (block 1815). For example, assuming a base frame rate of 30 fps (during normal operation mode), during the coordination setup mode, the frame rate of the slave depth sensing device can be increased to 30.1 fps. It would be appreciated that the values provided here are a mere example, and are not meant to limit the scope of the presently disclosed subject matter. In other example, the frame rate of the salve device can be decreased.

Still further in accordance of examples of the presently disclosed subject matter, the frame rate of the master depth sensing device can be maintained at the base frame rate (block 1820). It would be appreciated that in case the base frame rate is an existing or a default configuration in the master depth sensing device block 1820 may not be required.

Resuming the description of FIG. 18, at each frame, the master depth sensing device captures the light reflected from a scene and evaluates an optical pattern which is indicative of a full pulse overlap (block 1825). A full pulse overlap occurs when the pulse emitted by the salve device completely overlaps with the pulse projected by the master device. The extent of overlap can be evaluated from the reflected portion of the light projected by the projectors of the master and the slave devices. It would be appreciated that a full overlap as this terms is used here can imply a full overlap range where a certain tolerance margin is applied to the absolute full overlap frame profile, for example, to allow for various conditional and/or equipment related and similar shifts in optical values, and the term full overlap should be construed accordingly.

By way of example, the processing of the imaged frame and the evaluation of the optical pattern can include processing of the imaged frame histogram. It would be appreciated that, the greater the overlap between the pulses of the depth sensing devices (especially when pulse duration is equal) the greater the intensity of the reflected portion of the projected light. It would also be appreciated that in order to correctly identify a peak in the intensity levels at least a few frames are required.

Still further by way of example, the processing of the imaged histogram can include evaluating a brightness measure (e.g. an average brightness value, a similar statistical brightness measure). Still further by way of example, the processing of the imaged histogram can include searching for an average brightness peak. It would be appreciated that in some examples of the presently disclosed subject matter, an average brightness peak can be indicative of a full (or near full) pulse overlap (during a given frame the pattern is projected by each of the master and the slave depth sensing devices during fully overlapping exposure durations or pulse duration periods). Still further by way of example, an average brightness peak can be indicative of a closest to full pulse overlap, for example, in case a decrease in the average brightness level is detected following a series of frames in which the average brightness level gradually increased, it can be deduced that the previous frame provided the peak brightness value.

When a full pulse overlap is detected in an imaged frame (e.g., by the master depth sensing device), a frame rate of the slave depth sensing device can be adapted (e.g., decreased) in a second direction that is opposite to the first direction (block 1830). For example, assuming a base frame rate of 30 fps (during normal operation mode), during the coordination mode, once it is determined that a full pulse overlap occurred, the frame rate of the slave 3D imaging device can be decreased to 29.9 fps. It would be appreciated that the values provided here are a mere example, and are not meant to limit the scope of the presently disclosed subject matter. Furthermore, the direction of the modification of frame rate when a full overlap is detected is not limited, and the frame rate can be adjusted in any desired direction to achieve the pulse coordination or a target pulse timing offset.

In yet another example, a coordination setup, which uses a series of frame captures to detect when the pulses of two depth sensing devices overlap, can include, configuring one (or both devices) to change the timing of the pulse firing (and the timing of the exposure) to a certain point which would provide a desired offset between the firing of the pulses of the two depth sensing devices, and this operation can replace blocks 1830-1840. In other words, the firing and pulses and processing of captured signals to detect when there is a full overlap of the projections as an indication of the timing when the pulse timing one two depth sensing devices fully overlaps can be used to determine when the two devices are synchronized, and the offset can be set by re-programming the timing when a pulse is emitted on either or just one of the devices to reach a desired offset (and coordination).

Resuming now the description of FIG. 18, the two depth sensing devices can be operated for a certain period during which the master depth sensing device maintains the base frame rate, and the slave depth sensing device is in the decreased (or increased) frame rate, until a certain offset is achieved between the timing of the pulses on the master and the slave depth sensing device (block 1835). It would be appreciated that the coordinated pulse timing can be obtained by operating the two 3D imaging devices for a certain number of frames in which the master depth sensing device maintains the base frame rate, and the slave depth sensing device is in the decreased frame rate.

According to examples of the presently disclosed subject matter, the offset between the timing of pulse on a first depth sensing device and the timing of a pulse on a second depth sensing device whose pulse is coordinated with the first device can be a in the order of few milliseconds—for example 6 ms.

The above implementation of determining and setting a coordinated pulse timing scheme was described with reference to a structured light projection method, which uses a projection of a known pattern onto a scene and an image of a reflected portion of the projected pattern to extract depth information from a scene. However, this implementation can also be used to setup a coordinated pulse timing scheme which use other method to encode the light, including a TOF depth sensing method.

Figure 19:
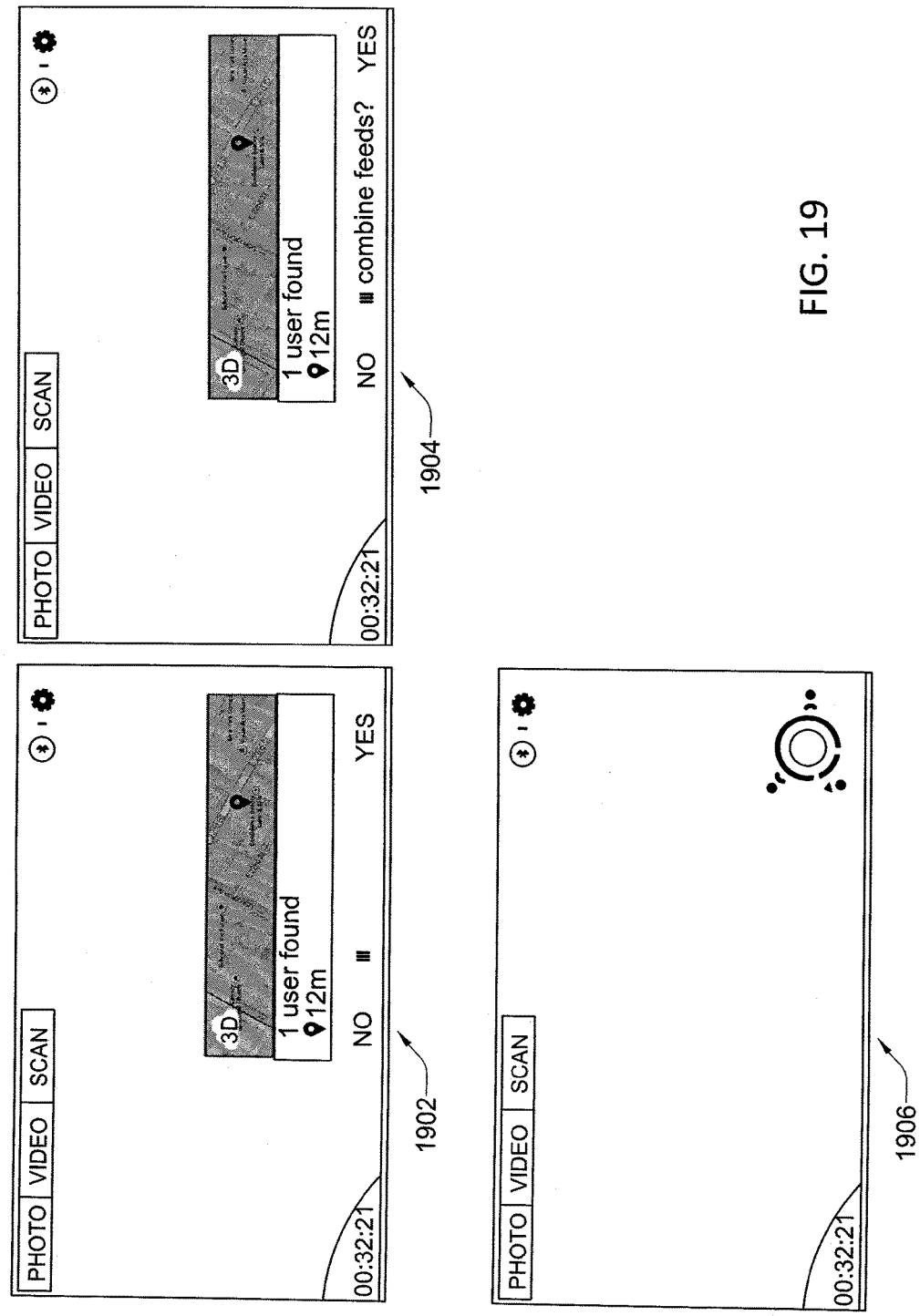
FIG. 19 shows possible GUI screenshots which are associated with the setting up and implementation of a coordinated pulse timing scheme in a multi-device coordinated depth sensing group.

Referring now to FIG. 19, there are shown possible GUI screenshots which are associated with the setting up and implementation of a coordinated pulse timing scheme in a multi-device coordinated depth sensing group. Screen 1902 shows a display screen of a first depth sensing device when a second depth sensing device is detected. The screen of the first depth sensing device shows an indication that the second depth sensing device is detected in the vicinity of the first device. As mentioned above only devices which are configured to allow connection with another device and which allow and support coordinated depth sensing are detectable.

On screen 1904 the user is presented with an option to connect to the other device to establish a multi-device coordinated depth sensing group. Additional data can be provided to the user, which can assist the user in making a decision or setting configurations. For example, the distance between the user's device and the detected device can be presented, possibly with an indication (e.g., on a map) of the other device's location.

Screen 1906 shows features of a display during an ongoing coordinated and collaborative depth sensing session. The locations or the devices participating in the coordinated and collaborative depth sensing session relative to a scene or relative to an object of interest is illustrated, and the portion of the scene that is covered by each device is also shown. This display feature gives the user a sense of their combined coverage, and allows the users to move their devices and scan areas of the scene or of the object of interest for which depth information is not yet available. The coverage feature can aid the devices to achieve full coverage (or as broad a coverage as possible).

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A depth sensing system, comprising:
    a first depth sensing device comprising a first projector and a first image sensor, where the first depth sensing device is configured to operate at a first frame rate;
    a second depth sensing device comprising a second projector and a second image sensor, where the second depth sensing device is configured to operate at a second frame rate;
    a processor adapted to configure the first and the second depth sensing devices, such that in a single frame of the first depth sensing device:
        the first projector projects a first projection during a first projection duration;
        the second projector projects a second projection during a second projection duration consecutive to the first projection duration;
        the first image sensor captures an image including a reflection of the first projection during a first exposure period; and
        the second image sensor captures an image including a reflection of the second projection during a second exposure period.

2. The system according to claim 1, wherein the processor is adapted to allocate a buffer in between the first projection duration and the second projection duration.

3. The system according to claim 1, wherein the first depth sensing device comprises a first clock generator and the second depth sensing device comprises a second clock generator, and wherein the processor is configured to synchronize the second clock generator with the first clock generator.

4. The system according to claim 1, wherein the processor is configured to synchronize a start of frame timing on the second depth sensing device with a start of frame timing on the first depth sensing device, giving rise to a synchronized start of frame timing, and setting a timing of each of the first projection and the second projection as a different offset from the synchronized start of frame timing.

5. The system according to claim 1, wherein the processor is adapted to configure the first and the second depth sensing devices such that the first projection takes place substantially at a start of a frame timing on the first depth sensing device, and each subsequent projection occurring during the frame starts at a point which is offset from the start of frame timing by a time period which is equal to a duration of all previous projections during the frame plus a buffer in between any two projections of the previous projections during the frame.

6. The system according to claim 1, wherein the processor is implemented in the first depth sensing device, and wherein the first depth sensing device serves as a master device and the second depth sensing device serves as a slave device.

7. The system according to claim 6, wherein said processor is configured to send to the slave device instructions to set a timing of the second projection according to a timing and a duration of the first projection.

8. The system according to claim 1, wherein a timing of the first exposure is coordinated with the first projection, and the timing of the second exposure is coordinated with the second projection.

9. The system according to claim 1, wherein the processor is adapted to configure the first depth sensing device and the second depth sensing device, such that in a single frame of the first depth sensing device: the first projection and the second projection are each used to project light on to a scene, and a first image of a reflected portion of the first projection and a second image of a reflected portion of the second projection are captured.

10. The system according to claim 1, wherein the first frame rate and the second frame rate are equal.

11. A computer implemented method of controlling a depth sensing system, comprising:
    using a processor to configure each of:
        a first depth sensing device comprising a first projector and a first image sensor, where the first depth sensing device is configured to operate at a first frame rate;
        a second depth sensing device comprising a second projector and a second image sensor, where the second depth sensing device is configured to operate at a second frame rate;
    such that in a single frame of the first depth sensing device:
        the first projector projects a first projection during a first projection duration;
        the second projector projects a second projection during a second projection duration consecutive to the first projection duration;
        the first image sensor captures an image including a reflection of the first projection during a first exposure period; and
        the second image sensor captures an image including a reflection of the second projection during a second exposure period.

12. The method according to claim 11, further comprising using the processor to allocate a buffer in between the first projection duration and the second projection duration.

13. The method according to claim 11, further comprising using the processor to synchronize a second clock generator of the second depth sensing device with a first clock generator of the first depth sensing device.

14. The method according to claim 11, further comprising using the processor to synchronize a start of frame timing on the second depth sensing device with the start of frame timing on the first depth sensing device, giving rise to a synchronized start of frame timing, and setting a timing of each of the first projection and the second projection as a different offset from the synchronized start of frame timing.

15. The method according to claim 11, further comprising using the processor to configure the first and the second depth sensing devices such that the first projection takes place substantially at a start of a frame timing on the first depth sensing device, and each subsequent projection occurring during the frame starts at a point which is offset from the start of frame timing by a time period which is equal to a duration of all previous projections during the frame plus a buffer in between any two projections of the previous projections during the frame.

16. The method according to claim 11, wherein the processor is implemented in the first depth sensing device, and wherein the first depth sensing device serves as a master device and the second depth sensing device serves as a slave device.

17. The method according to claim 11, wherein in a single frame of the first depth sensing device: the first projection and the second projection are each used to project light on to a scene, and a first image of a reflected portion of the first projection and a second image of a reflected portion of the second projection are captured.

18. The method according to claim 11, wherein the first frame rate and the second frame rate are equal.

* * * * *